(12) United States Patent
Eckroad et al.

(10) Patent No.: US 7,701,087 B2
(45) Date of Patent: Apr. 20, 2010

(54) INTEGRATED CLOSED LOOP CONTROL METHOD AND APPARATUS FOR COMBINED UNINTERRUPTIBLE POWER SUPPLY AND GENERATOR SYSTEM

(75) Inventors: Steven Eckroad, Charlotte, NC (US); Franz-Joseph Unterlab, Adelsdorf (DE); Martin Hilscher, Erlangen (DE); Hans-Christian Doht, Erlangen (DE)

(73) Assignee: Electric Power Research Institute, Inc., Charlotte, NC (US)

( * ) Notice: Subject to any disclaimer, the term of this patent is extended or adjusted under 35 U.S.C. 154(b) by 0 days.

(21) Appl. No.: 11/951,738

(22) Filed: Dec. 6, 2007

(65) Prior Publication Data

US 2008/0088183 A1    Apr. 17, 2008

Related U.S. Application Data

(62) Division of application No. 10/729,428, filed on Dec. 5, 2003, now abandoned.

(51) Int. Cl.
    *H02J 1/12* (2006.01)
(52) U.S. Cl. .......................................... 307/46; 307/67
(58) Field of Classification Search ................. 307/87, 307/46, 67
    See application file for complete search history.

(56) References Cited

U.S. PATENT DOCUMENTS

| | | | |
|---|---|---|---|
| 5,343,079 A * | 8/1994 | Mohan et al. | 307/105 |
| 5,376,828 A | 12/1994 | Kim et al. | |
| 5,602,725 A | 2/1997 | Venkataramanan | |
| 6,134,124 A | 10/2000 | Jungreis et al. | |
| 6,191,500 B1 | 2/2001 | Toy | |

(Continued)

FOREIGN PATENT DOCUMENTS

JP            05-211732            8/1993

(Continued)

OTHER PUBLICATIONS

Ise et al., Definitions of Power Quality Levels and the Simplest Approach for Unbundled Power Quality Service, Publication Date 2000, IEEE Harmonics and Quality of Power Proceedings, vol. 2, pp. 385-390.*

(Continued)

*Primary Examiner*—Albert W Paladini
*Assistant Examiner*—Daniel Cavallari
(74) *Attorney, Agent, or Firm*—Trego, Hines & Ladenheim, PLLC

(57) ABSTRACT

The present invention provides a method, computer program product, and apparatus and control system and method for providing substantially uninterrupted power to a load. The apparatus includes a control system coupled with an electrical power storage subsystem and a electrical power generator. The control system is configured to provide a plurality of modes of operation including at least a static compensator (STATCOM) mode, an uninterruptible power supply (UPS) mode and a generator mode (gen set), and to control transitions between each of the plurality of modes. In one embodiment, the control system is an integrated closed loop control system that includes a current control system and a voltage control system. The apparatus is capable of operating at least two of the plurality of modes simultaneously, including ramping the gen set mode up and simultaneously ramping the UPS mode down as the gen set mode is ramped down.

10 Claims, 23 Drawing Sheets

U.S. PATENT DOCUMENTS

| | | | |
|---|---|---|---|
| 6,198,176 | B1 | 3/2001 | Gillette |
| 6,204,572 | B1 * | 3/2001 | Liran .......................... 307/64 |
| 6,304,006 | B1 * | 10/2001 | Jungreis ...................... 307/64 |
| 6,392,856 | B1 | 5/2002 | Kehrli et al. |
| 6,563,234 | B2 | 5/2003 | Hasegawa et al. |
| 6,670,721 | B2 | 12/2003 | Lof et al. |
| 6,747,370 | B2 | 6/2004 | Abe |
| 6,849,967 | B2 * | 2/2005 | Lathrop et al. ................ 307/64 |
| 2001/0043013 | A1 * | 11/2001 | Abe .......................... 307/66 |
| 2002/0175522 | A1 | 11/2002 | Wacknov et al. |
| 2003/0160514 | A1 | 8/2003 | Rajagopalan |
| 2003/0229423 | A1 | 12/2003 | Andarawis et al. |
| 2004/0084965 | A1 * | 5/2004 | Welches et al. ............... 307/64 |

FOREIGN PATENT DOCUMENTS

| | | |
|---|---|---|
| JP | 09-266631 | 10/1997 |
| JP | 10-126980 | 5/1998 |
| JP | 11-289668 | 10/1999 |
| JP | 2001-161098 | 6/2001 |
| JP | 2001-327083 | 11/2001 |

OTHER PUBLICATIONS

Sao et al., A Benchmark System for Digital Time-Domain Simulation of a Pulse-Width-Modulated D-Statcom, IEEE Transaction on Power Delivery, vol. 17, No. 4, Oct. 2002, pp. 1113-1116.*

* cited by examiner

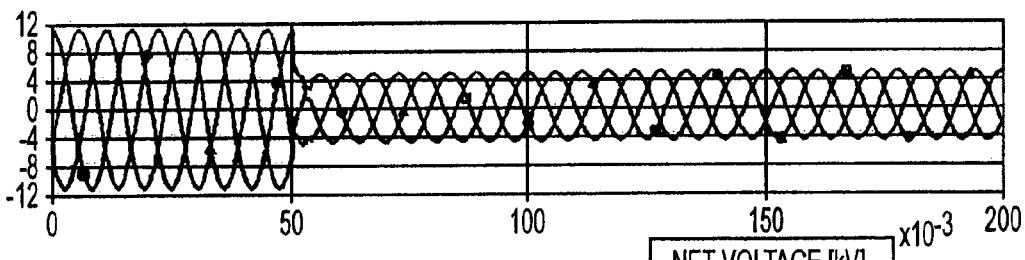
FIG. 14A — NET VOLTAGE [kV] □Van ○Vbn ▲Vcn
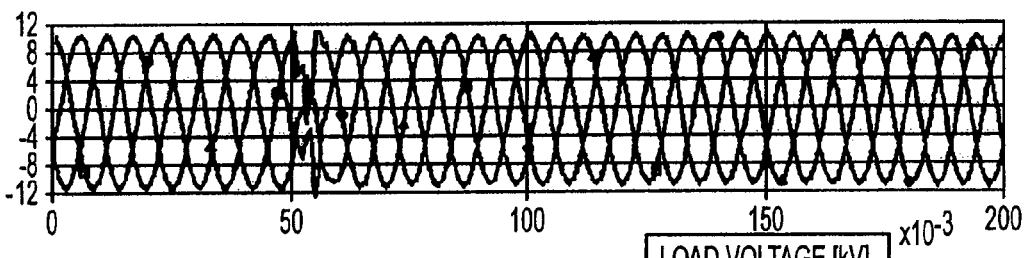
FIG. 14B — LOAD VOLTAGE [kV] □Val ○Vbl ▲Vcl
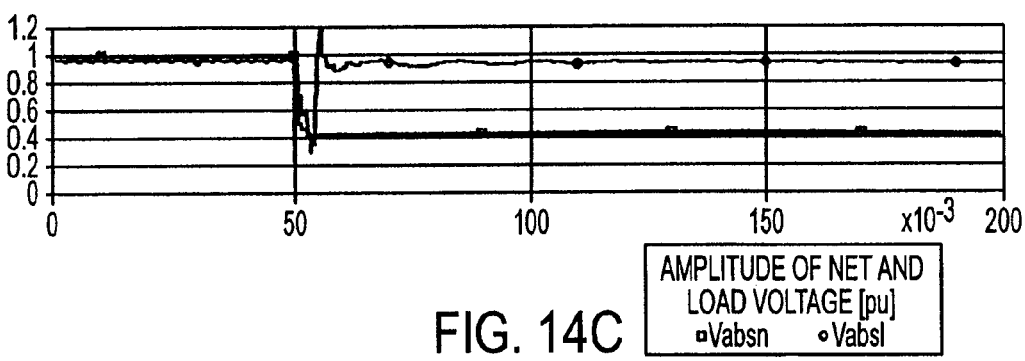
FIG. 14C — AMPLITUDE OF NET AND LOAD VOLTAGE [pu] □Vabsn ○Vabsl
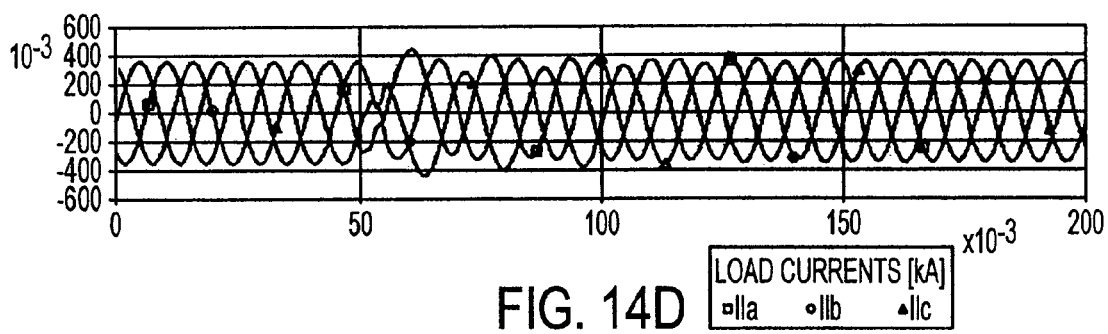
FIG. 14D — LOAD CURRENTS [kA] □Ila ○Ilb ▲Ilc
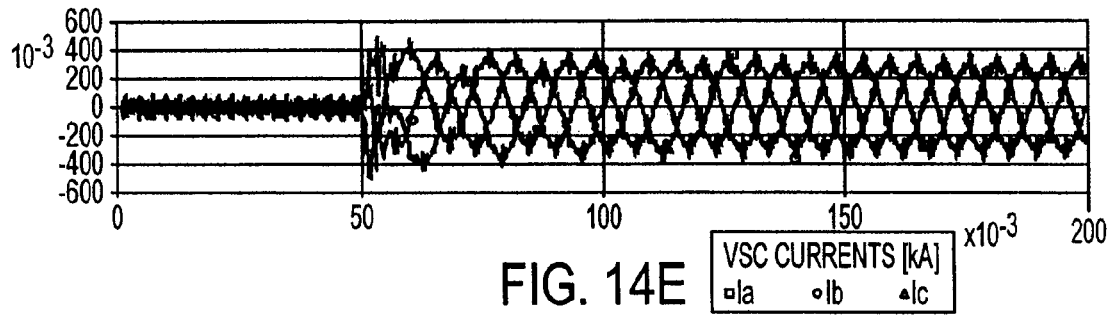
FIG. 14E — VSC CURRENTS [kA] □Ia ○Ib ▲Ic

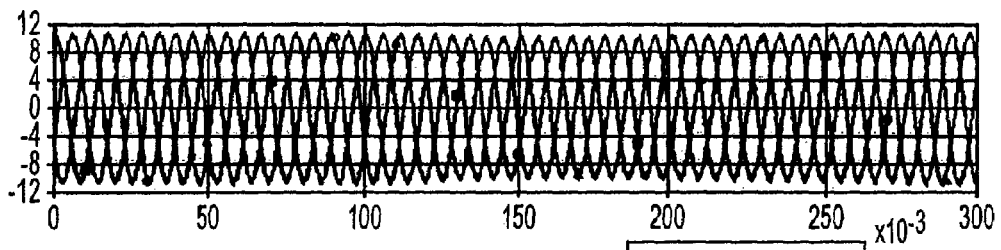
FIG. 15A  LOAD VOLTAGE [kV]  □Val  ○Vbl  ▲Vcl
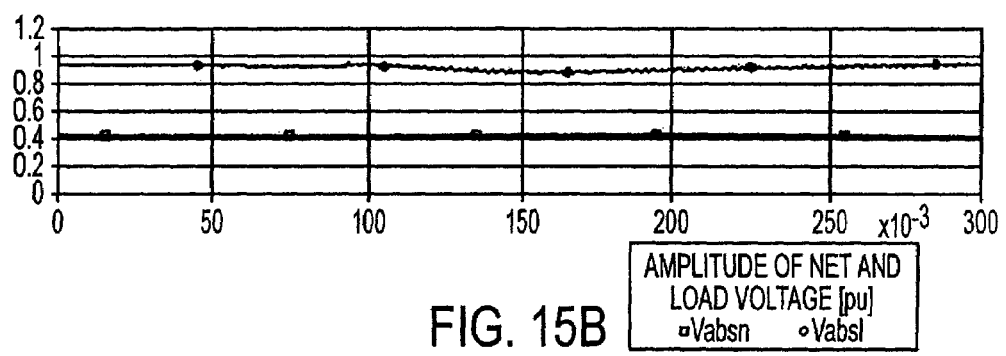
FIG. 15B  AMPLITUDE OF NET AND LOAD VOLTAGE [pu]  □Vabsn  ○Vabsl
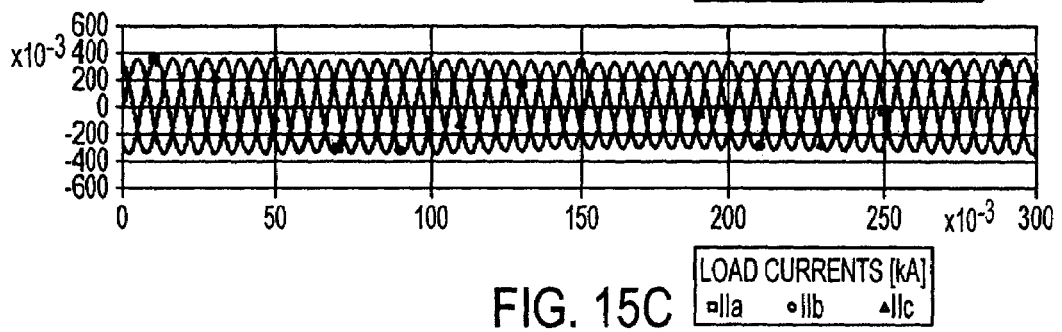
FIG. 15C  LOAD CURRENTS [kA]  □Ila  ○Ilb  ▲Ilc
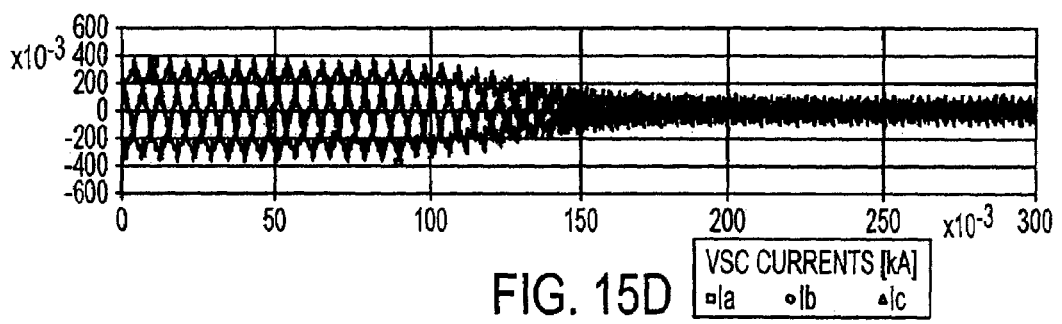
FIG. 15D  VSC CURRENTS [kA]  □Ia  ○Ib  ▲Ic
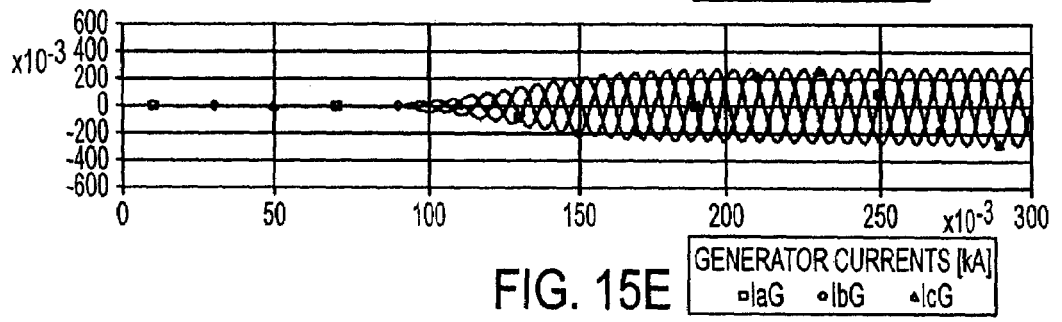
FIG. 15E  GENERATOR CURRENTS [kA]  □IaG  ○IbG  ▲IcG

INTEGRATED CLOSED LOOP CONTROL METHOD AND APPARATUS FOR COMBINED UNINTERRUPTIBLE POWER SUPPLY AND GENERATOR SYSTEM

RELATED APPLICATIONS

This application is a divisional of U.S. Non-Provisional application Ser. No. 10/729,428 filed Dec. 5, 2003 entitled Integrated Closed Loop Control Method And Apparatus For Combined Uninterruptible Power Supply And Generator System; which application is incorporated herein by reference.

FIELD OF THE INVENTION

This invention pertains generally to control systems, and more particularly to control systems allowing plug-and-play integration of modules in a power conditioning system.

BACKGROUND

There are different devices known in the art for improving power quality and reliability of grid or utility line power supplied to sensitive loads. Three of these include, a static compensator (STATCOM), an on-line uninterruptible power supply (UPS), and an off-line UPS. A UPS may also be operated in cooperation with a power generator or gen set, for long term interruptions.

FIG. 1A illustrates a typical STATCOM 100 in which a Voltage Source Converter (VSC) 102 is connected to an AC system 104 supplying a load 106 through a shunt-connected transformer 107. A capacitor 109 is connected to the DC terminals 108 of the VSC 102 and is usually an integral part of the VSC 102. The VSC 102 controls the line voltage by injecting or absorbing reactive power. A STATCOM aids in controlling load voltage fluctuations that result from a load's transient or changing reactive power requirements. While a STATCOM has relatively low operation costs, a STATCOM does not provide active power and therefore fails to operate under short circuit conditions or other conditions where active power provision is required or desired. Further, a STATCOM has a limited ability to correct voltage fluctuations due to grid faults or switching events.

FIG. 1B illustrates a block diagram of the main components of an exemplary on-line UPS system 110. This UPS system 110 is on-line during normal operation, where on-line operation includes converting energy from a grid or utility 112 through a rectifier 114 from AC to DC, maintaining a battery 116 at full charge, and converting the energy through an inverter 120 to an AC-system resulting in double conversion. A static bypass switch 123 and the mechanical bypass switch 124 are normally open. The UPS system 110 typically operates such that it is synchronized with the bypass source 126 or with the grid 112. A chemical battery 116 is used as energy storage for bridging outages. In case of a malfunction of the system 110 the mechanical switch 124 allows operation by connecting the grid 112 or bypass supply 126 directly to the load 130. In case of a malfunction on the load assembly, the static bypass switch 123 is closed to increase short circuit capability for fuse coordination. In case of a malfunction on the grid, the rectifier 114 is blocked and energy is taken from the battery 116 without disturbances on the load 130.

The on-line UPS 110 requires double conversion resulting in relatively low efficiency and high operation costs. Further, the grid 112 is decoupled from the load and, thus, there are no transients on the load voltage under grid disturbances. Short circuit capability is provided by closing the static bypass switch 123.

FIG. 1C illustrates a block diagram of the main components of a typical off-line UPS 140. The off-line UPS 140 is off-line during normal operation, where off-line operation provides that a solid state breaker (SSB) 122 is closed, a mechanical bypass switch 124 is open, and a static converter 142 maintains a battery 116 at full charge. A chemical battery 116 is typically used as energy storage for bridging outages. Outage and sag conditions on the grid must be detected and compensated for fast in order to protect the load or load assembly 130. In case of a malfunction on the load assembly 130, the SSB 122 remains closed to make use of the grid short circuit capability for fuse coordination. In case of a malfunction of the off-line UPS system 140, the mechanical bypass switch 124 allows operation by connecting the grid 112 directly to the load 130. In case of a malfunction on the grid, the SSB 122 will be opened and the converter 142 supplies the load. The off-line UPS 140 operates at relatively low operation costs. The grid 112 is coupled to the load 130, thus, grid disturbances are transferred to the load 130 under standby conditions (normal operation) until the SSB opens.

FIG. 2 shows a block diagram of a UPS system 148 having an off-line UPS 150 in cooperation with a power generator or gen set 152 for long term interruptions. The off-line UPS 150 consists of a converter 154 and an energy storage device 116, such as, for example, a chemical battery, an array of chemical batteries, or other storage devices or systems. The converter 154 provides fast dynamic behavior. The converter power semiconductor(s), typically used in the converter, however, have no or substantially no overload capability. An accompanying UPS control system (not shown) provides for operation of the switch 156 in the event of an outage or sag, and for proper charging of the battery.

For long term interruptions the independent gen set 152 is connected directly to the load side of the AC-system. The gen set 152 consists of a power source (such as, for example, a natural gas, diesel engine, gasoline engine or other engine) and a mechanical to electrical conversion device (i.e. a generator). An accompanying gen set control system (not shown) controls the torque and the speed of the shaft producing active power. In the conventional off-line IPS with an independent gen set, the gen set control system does not cooperate with the UPS control system. The shaft speed (for example revolutions per second) routinely corresponds to the electrical system frequency (for example, cycles per second or hertz). Typically, the gen set has a long response time to dynamic voltage (or current) variations and a large overload capability. The long response time is a result of the electromechanical and the power generation process with its rotating mass or momentum. System resonance frequencies in the area of a few Hertz are usual.

The gen set 152 and the UPS 150 each typically have their own independent closed loop control unit (not shown). The operation principle of the UPS system 148 provides for the operation of the two independent gen set 152 and UPS 150 devices in the following way:

1. Standby Mode: gen set 152 is not in operation, and UPS 150 is in standby mode, but is not exchanging power with the load (it may be maintaining the storage charge). System 148 control system (not shown) monitors the grid voltage. The switch 156 is closed.

2. Disturbance on the grid side: The system 148 initiates the switch 156 to open; the load 130 is taken over by the UPS 150 (island mode); and depending on the energy content of the storage device 116, the gen set 152 is started.

3. If the interruption is only short term: the system 148 initiates the switch 156 to close; load 130 is handed over to the grid 112; the storage device 116 is charged; and transfer back into standby mode; gen set 152 is not in operation.

4. If the interruption is long term: the system 148 transfers from the UPS 150 to the gen set 152; UPS system 150 remains in standby mode; and switch 156 is open.

5. When the long term interruption ends: the system 148 initiates the switch 156 to close; and the load 130 is transferred to the grid 112.

In the case of a long term operation, the gen set 152 provides the active power to the load. The operation of this UPS system 148 allows for one of either the gen set 156 or the UPS 150 to operate at any given time. There is no common control or coordination or simultaneous operation, only separate individual control of the gen set and UPS with sequential operation of each. The drawback of this operation principle is that the good dynamic behavior of the UPS (that is, rapid response to reactive or active power variations in the load and stabilization of frequency), especially during generator operation, cannot be used or achieved because there is no common control unit available.

The standby gen set provides limited dynamic behavior during start up, even if it is a diesel gen set (DGS) of the fast starting/running type (for example, of the type running at 1800 rpm), with lubrication system heating. In these systems the starting phase may typically last 5 to 8 seconds until nominal speed (no-load) has been reached after which one may switch in load elements.

DGS load connection or switch-in as well as rejection produce speed and frequency deviations requiring at least 2 to 5 seconds until frequency deviation has reached a steady state value (for example, made up of control dead time, fuel injection time constant and settling time). In the case of start up, this period must be added to the 5 to 8 seconds required for attaining nominal speed, as described above so that the total time for startup and stabilization may be at least 7 to 13 seconds or more. FIG. 3 shows a typical frequency 160 behavior during load switching. Typical frequency deviation resulting from speed deviation caused by load change (switch-in and rejection) of a standby diesel gen set. The so-called dynamic deviation depends on the:

Inertia (the rotating mass of the engine): small inertia large excursion.

Turbo-charging: the higher the charging degree the larger the deviation.

Size of loads subject to switching: the larger the load size the larger the deviation.

Frequency deviations (typically approximately 10% of rated frequency, or about .+−0.6 Hz for 60 Hz operation or .+−0.5 Hz for 50 Hz operation) lasting several seconds may cause trouble or even damage to frequency dependent loads like computer screens, TV sets and other such devices. Note that in nominal conventional grid connected power systems the steady state frequency deviation is held within .+−.0.1 Hz and that at frequencies below 58.5 Hz (that is, at a drop of 1.5 Hz) of system frequency (60 Hz) load shedding occurs.

Load takeover normally takes place stepwise (for example, in three 3 steps) due to the limited size of the diesel and gen-set (for economic reasons the equipment is usually sized not much larger than the load) as well as due to drastic speed deviations (and therefore drastic frequency excursions), as discussed above.

In order to avoid the frequency deviations and load takeover restrictions described above, system designers could specify a gen set size that is as much as five times larger than the load, with resulting economic penalties.

If a voltage source converter (VSC) is employed for the converter 154 then STATCOM operation is possible, exchanging reactive power, and absorbing active power to cover the losses. However, in conventional UPS plus gen set systems, the full functional advantages of using a four-quadrant voltage source converter (VSC) during transfer to and subsequent operation of the gen set are not realized at least since the individual UPS and gen set controls are not cooperated. Conventional control systems do not provide system designers as much incentive or flexibility to choose the VSC for the converter (see FIG. 2) since the VSC's full capabilities are not engaged by the available conventional control system technology.

SUMMARY

The invention provides an apparatus and method of providing uninterruptible power supply (UPS) capability or operating mode utilizing a voltage source converter (VSC), a source of stored energy, and/or generation together with an integrated cooperative control system. The invention provides for superior performance characteristics over a conventional uninterruptible power supply (UPS), and may be used for both critical loads or for stabilizing critical components in the electrical transmission and distribution grid. Method and apparatus performance improvement and optimization or near-optimization is achieved in both system hardware that provides the uninterruptible power supply and other component choice and operation. In particular, the invention makes it possible to fully utilize a voltage source converter (VSC) for the converter component of a conventional UPS to provide the UPS mode of operation without requiring all of the hardware and control of conventional UPS systems. Furthermore, with a VSC deployed, the inventive control method and apparatus enable a UPS to simultaneously control a load voltage while supplying load power, by independently injecting or absorbing both active and reactive power. Moreover, VSC functionality is preserved during transitions from one mode of operation to another, and during operation of an optionally connected generator set.

In one embodiment, in the event of a long term interruption, a power generation module, such as a gen set, supplies the power to the load. During this period, the inventive UPS operates in a standby mode, but is actively exchanging reactive and active power, as well as recharging a storage device as needed. In standby or charge mode the UPS continues to inject and absorb reactive power. Thus both systems, the UPS as well as the gen set, are in operation. In one embodiment, the overall apparatus is optimized by providing a control system and method for simultaneously and jointly controlling the UPS and the gen set in all operating modes as a single cooperative closed loop control.

Thus, the inventive method and apparatus result in superior performance over conventional systems and methods, by operating the UPS as a static compensator (STATCOM) throughout the entire event duration, whether short or long term, to respond to the load's reactive power requirements. Embodiments of the novel method and apparatus, further, perform dynamic load leveling by providing or absorbing active power, improving and usually optimizing dynamic behavior under island conditions (where the load is isolated from the power grid and may sharply vary over short time periods), and optimizing or nearly optimizing behavior during transitions including load pick up by the UPS, hand off between the UPS and gen set, and re-synchronization to the grid. The inventive method may advantageously be implemented as a computer program and computer program product executing on or in a general or special purpose computer having a processor for executing computer instructions and a coupled memory for storing data, instructions, and commands.

BRIEF DESCRIPTION OF THE DRAWINGS

FIG. 14A shows a graphical representation of the three phase grid voltage with the voltage sag.

FIG. 14B shows the graphical representation of the three phase load voltage during the voltage sag.

FIG. 14C depicts a graphical representation of the amplitude of the grid voltage and the load voltage showing the system's rapid response to the sag.

FIG. 14D depicts a graphical representation of the three phase load currents.

FIG. 14E depicts a graphical representation of the three phase compensation currents supplied by VSC and storage supply to the load.

FIG. 15A graphically depicts the load voltage as the voltage supplied to load transitions from the VSC to the gen set.

FIG. 15B graphically depicts the amplitude of the grid voltage and the load voltage as the gen set takes over and supplies power to the load.

FIG. 15C graphically shows the three phase load current as the gen set takes over.

FIG. 15D graphically shows the three phase VSC current as the load sharing ramps down the VSC.

FIG. 15E graphically shows the three phase generator current as the load sharing ramps up the gen set current supplied to the load.

DETAILED DESCRIPTION

The novel method and apparatus of the present invention, in one advantageous application, provides power to normal electrical loads and more especially to sensitive loads, such as semiconductor manufacturing plants, data centers, Internet or data server farms, and other sensitive loads, even under voltage disturbances and interruptions on the grid side.

Figure 1A:
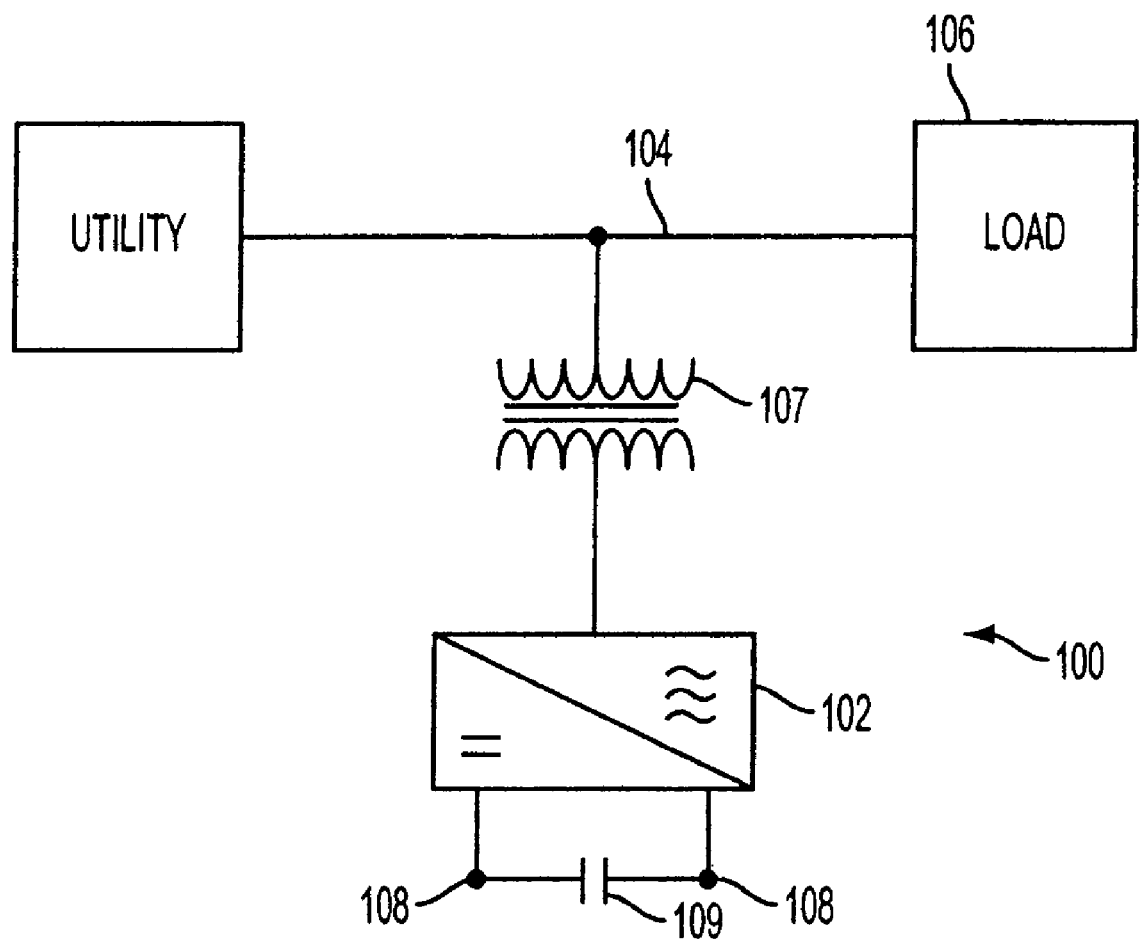
FIG. 1A depicts a block diagram of the main components of a conventional static compensator (STATCOM).
Figure 1B:
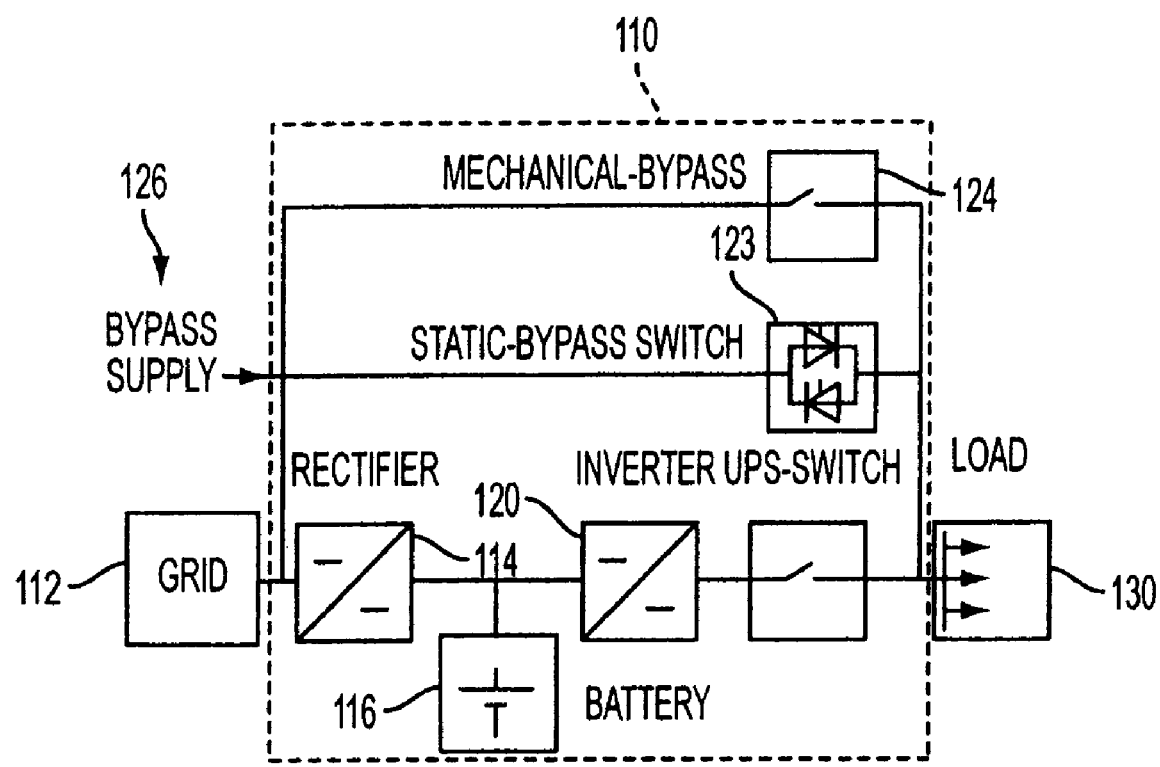
FIG. 1B depicts a block diagram of the main components of a conventional on-line uninterruptible power supply (UPS).
Figure 1C:
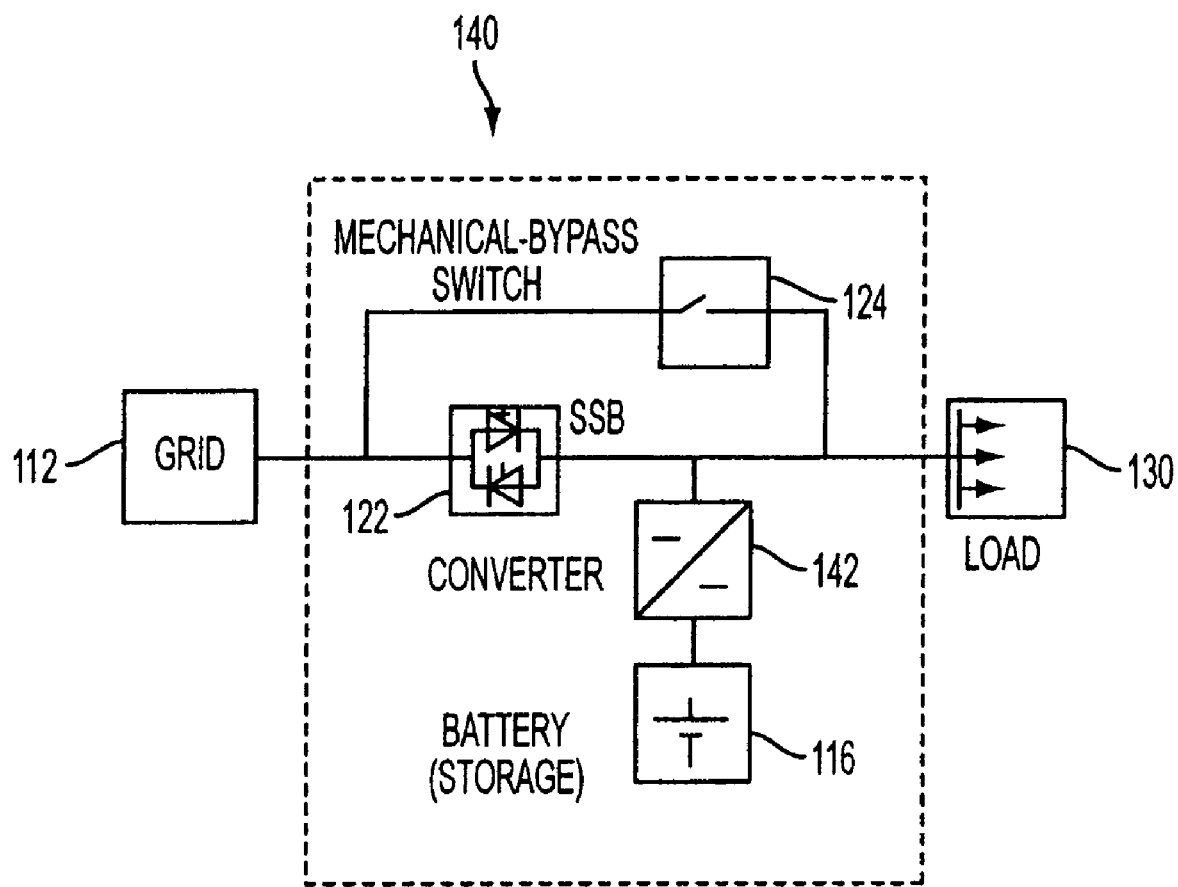
FIG. 1C depicts a block diagram of the main components of a conventional off-line UPS.
Figure 2:
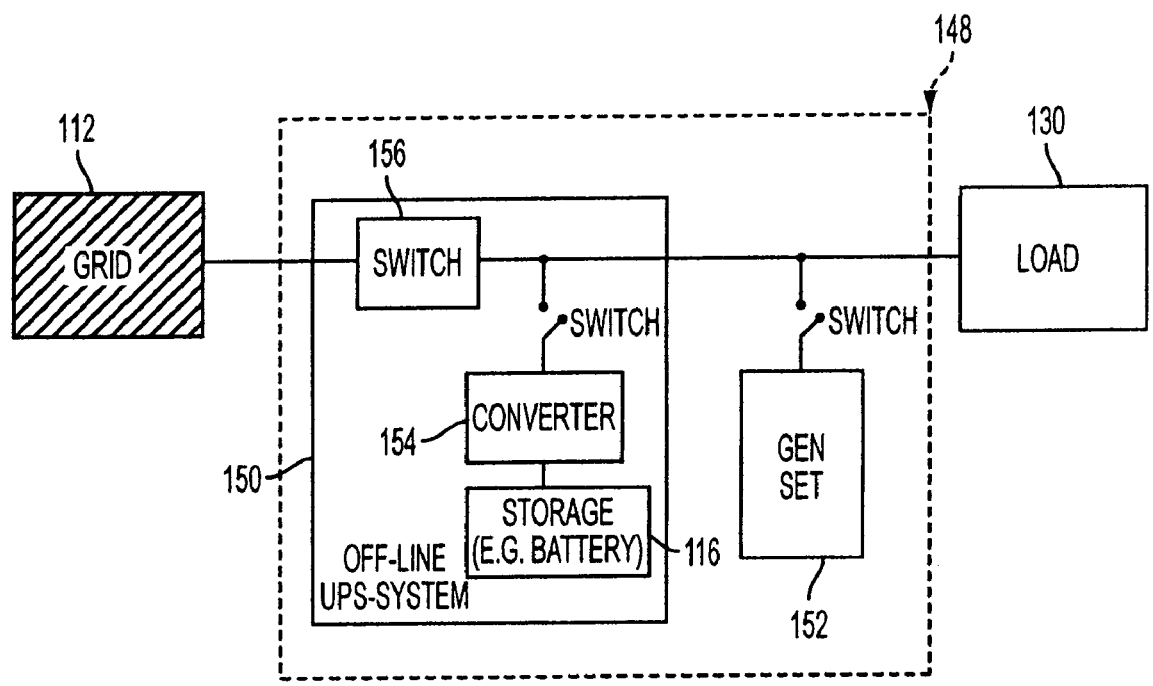
FIG. 2 depicts a block diagram of a conventional UPS system having an off-line UPS in cooperation with a power generator or gen set for long term interruptions.
Figure 3:
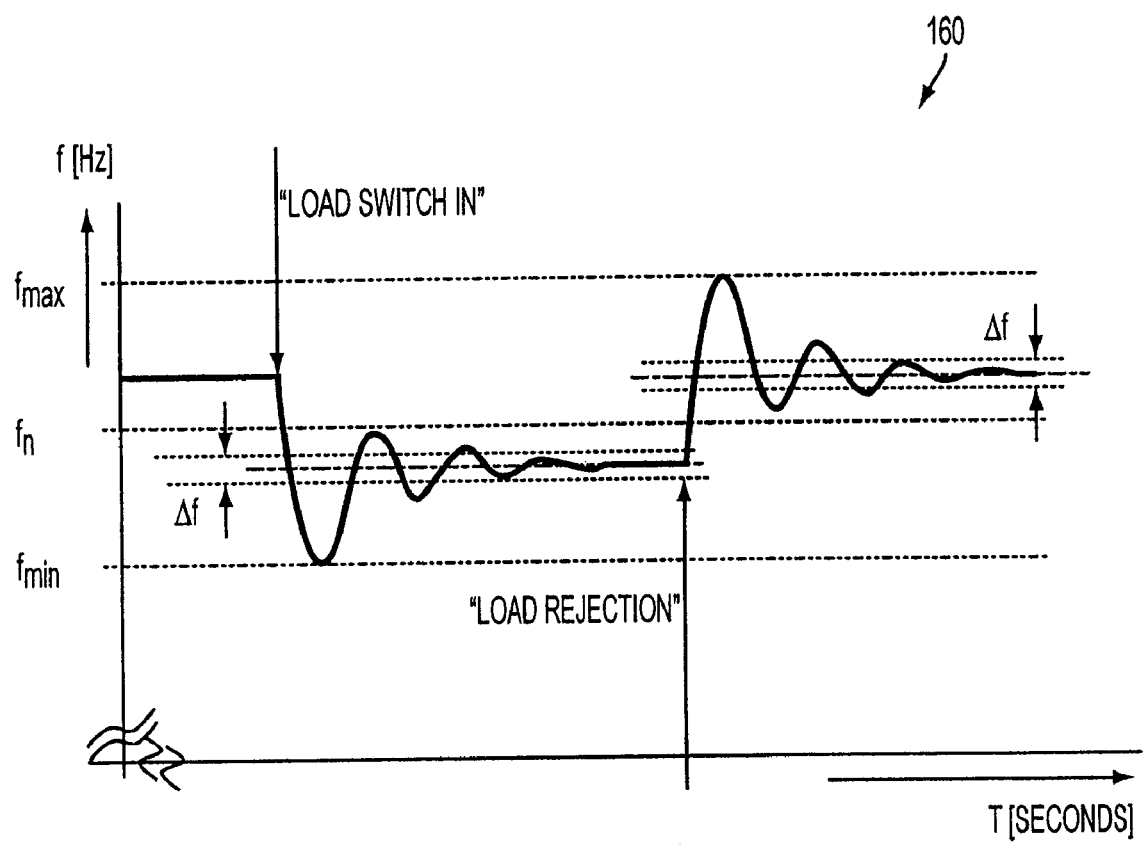
FIG. 3 depicts a typical frequency behavior during load switching.
Figure 4A:
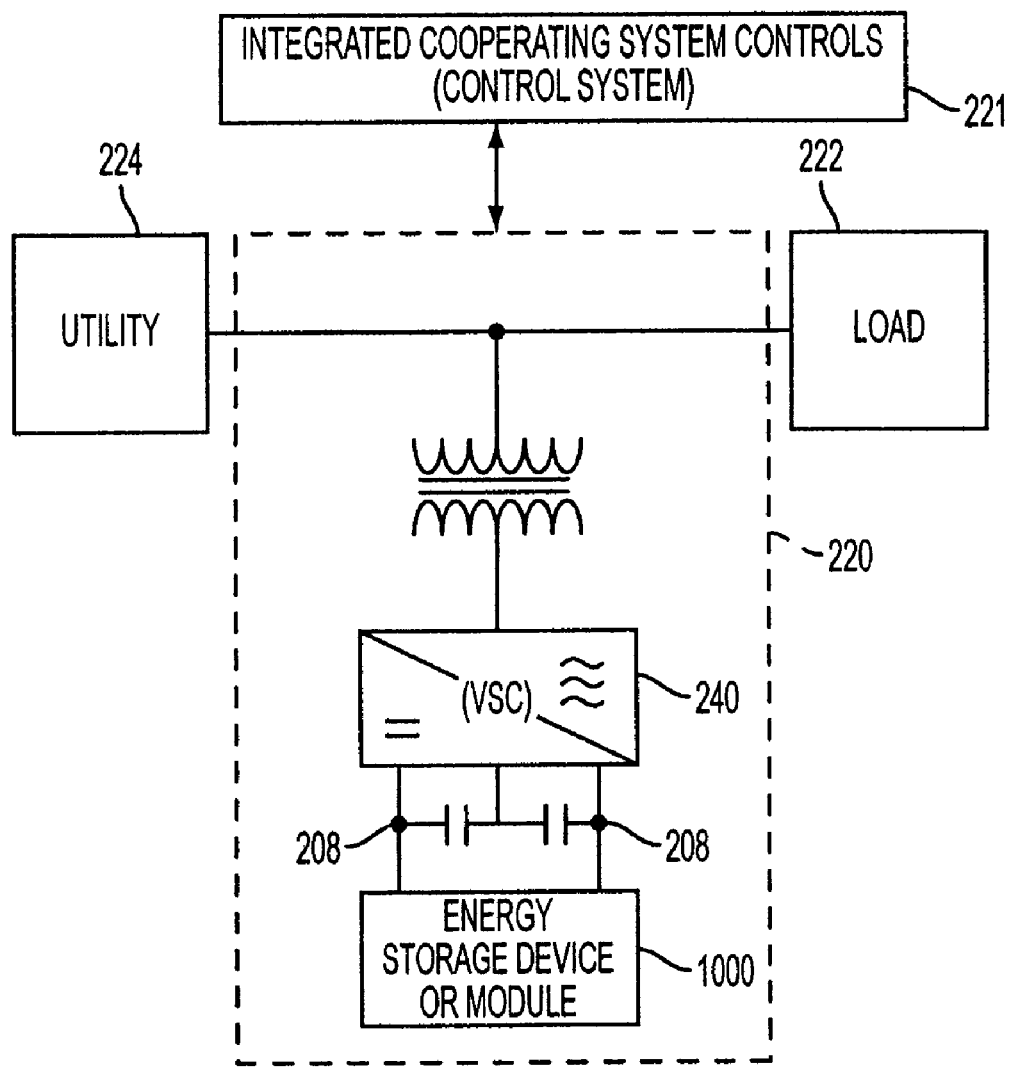
FIG. 4A depicts a simplified block diagram of an exemplary embodiment of the inventive power source apparatus or system.

As shown in FIG. 4A, the Voltage Source Converter (VSC) 240 of a static compensator or STATCOM, can be connected to an energy storage device 1000 at the direct-current or DC terminals 208 of the VSC 240. The VSC 240 can draw real power from the energy storage device 1000 and deliver it as alternating-current or AC power to provide temporary system support. The VSC 240 can also control the line voltage by injecting or absorbing reactive power. The VSC can also control energy absorption from the AC system to keep the energy storage device charged.

Figure 4B:
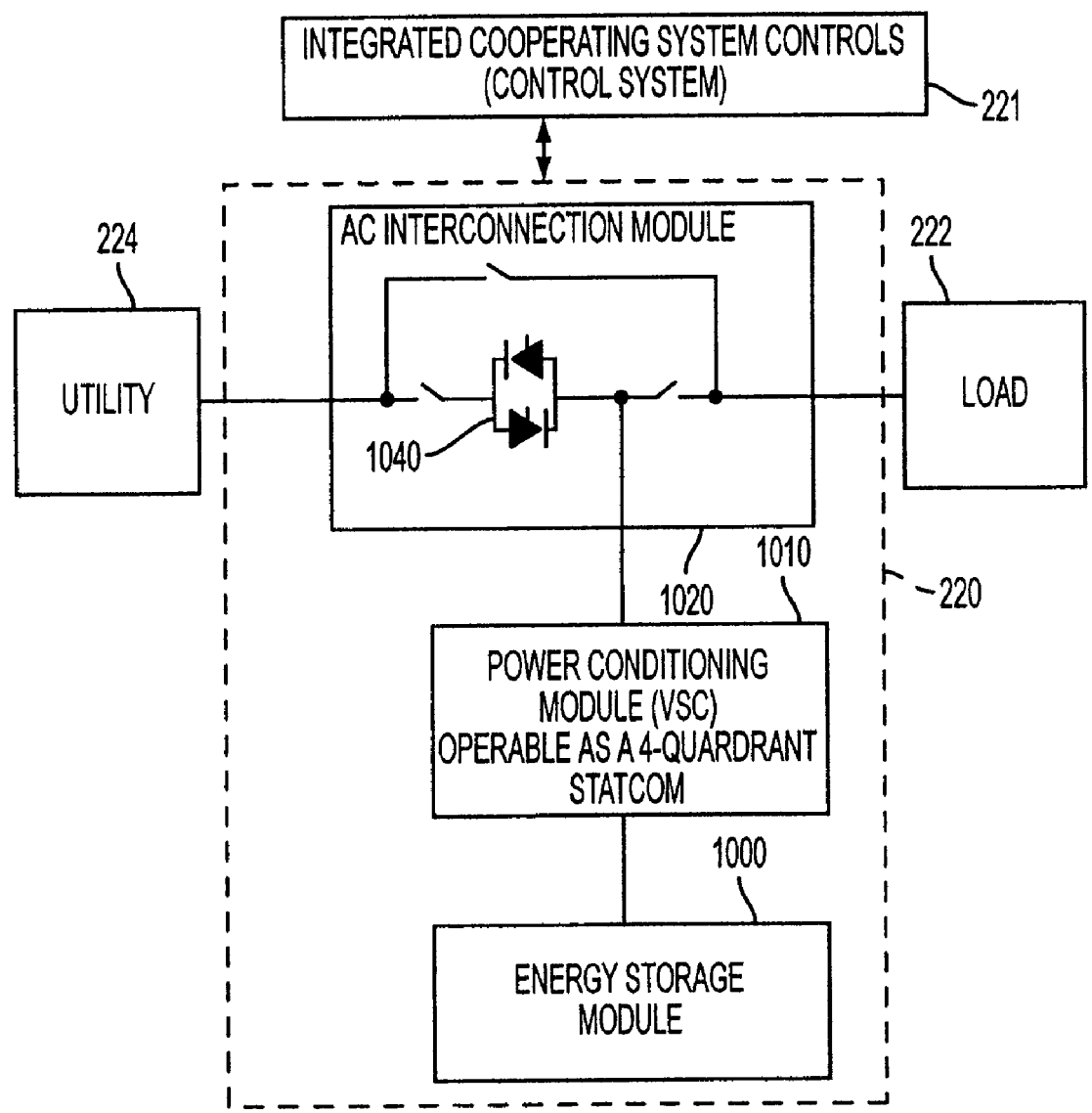
FIG. 4B depicts a simplified block diagram of another embodiment of the inventive power source apparatus or system.

FIG. 4B depicts a block diagram of one embodiment of a power system 220 in accordance with the present invention in which the power system 220 includes a plurality of modules. The power system 220, for example, includes an AC interconnection module 1020, a power conditioning module 1010, system controls 221 which in at least this embodiment are a set of integrated cooperating system controls, and an energy storage module 1000. The set of integrated cooperating system controls may advantageously be implemented as a computer program on a general or special purpose computer. Additional implementations and embodiments of embodiments of the integrated cooperating system control are illustrated and described relative to FIGS. 8-9 and elsewhere in the specification. The power system 220 is designed to provide real and reactive power for load 222 during short-term interruptions of utility 224. Power system 220 operates off-line. When a voltage disturbance is sensed on grid or utility 224, the system 220 creates a complete disconnect from grid or utility 224 and provides back up power to the load 222 via the energy storage module 1000. The power system 220 provides performance characteristics of both a static compensator (STATCOM) and a conventional off-line uninterruptible power source (UPS), operating in cooperation.

The overall system and method of operation and control as well as of individual modules are preferably technology independent—that is, applies to various technologies without limitation. The energy storage module 1000, for example, may be implemented by batteries, fuel cells, superconducting magnets (SMES), electrochemical capacitors, flywheels, other energy storage mechanisms, systems, or methods known in the art, or any combination of these energy storage mechanisms, systems, or methods. The power conditioning module 1010 and static isolation switch 1040 with a bus reactor in the AC connection module 1020 are advantageously implemented with solid-state technology and physical devices, but one skilled in the art would recognize that other technologies may be utilized to implement these features to achieve the desired operation and function.

Figure 4C:
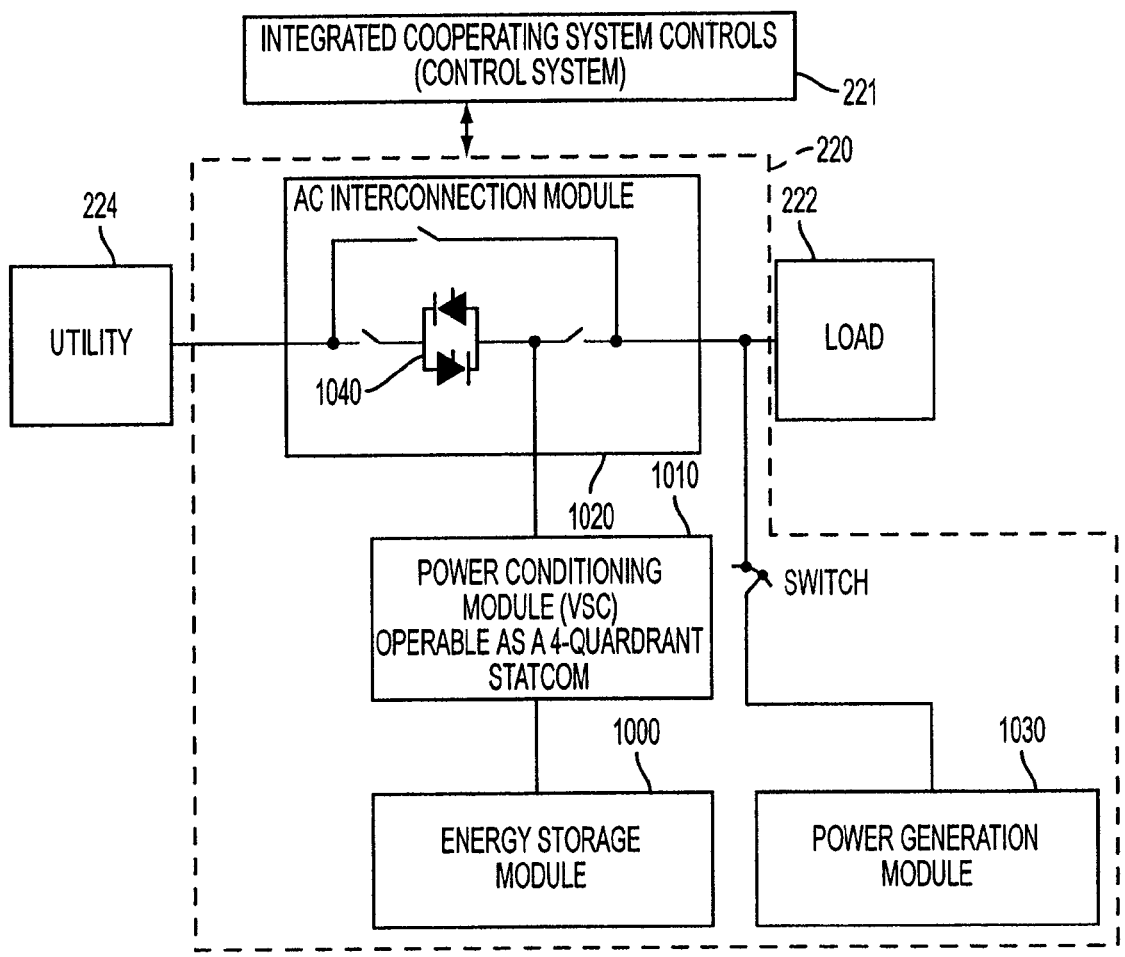
FIG. 4C depicts a simplified block diagram of another embodiment of the inventive power source apparatus or system.

FIG. 4C depicts an alternative embodiment of a power system 220 that further includes a power generation module 1030 to provide power for longer duration interruptions. Again, when a voltage disturbance is sensed on grid or utility 224, the system 220 creates a complete disconnect from grid or utility 224 and provides for a full ramp-up of the back up power generation source to the load 222. The system provides the performance characteristics of a static compensator (STATCOM) and a conventional off-line uninterruptible power source (UPS) as well as an alternative power generation source, operating in cooperation. For example, the inventive control methodology and apparatus achieves STATCOM performance characteristics during both transitions to and operation in generation mode as well as in other operating modes. As described above, the overall system and method and individual modules and module methodology are advantageously technology-type independent.

The power generation module 1030, for example, may be implemented by combustion turbines, micro-turbines, diesel gen sets (AC- or DC-connected), internal combustion (IC) engines, fuel cells, and other power generation mechanisms known in the art, or any combination of these technologies. A diesel gen set, as used herein and as known in the art, is for example a combination of a diesel engine (or other prime mover) and an electrical synchronous generator (or other converter from kinetic energy to electrical energy). It is to be understood that the generation module 1030 is optional and allows the system to provide power from a dedicated fuel supply (of whatever type) during longer duration power interruptions. Without the generation module, the power system 220 may still provide real and reactive power for shorter-term interruptions.

Figure 5:
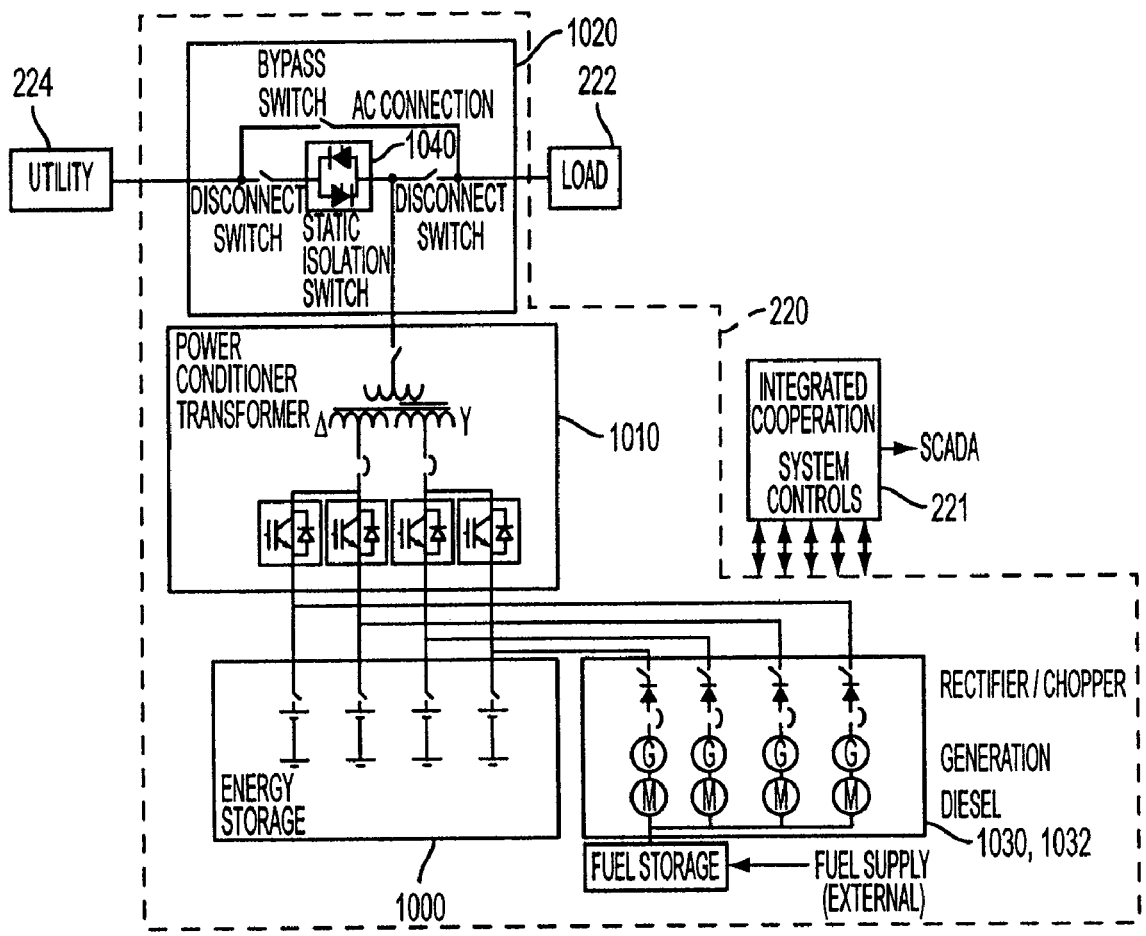
FIG. 5 depicts a simplified block diagram of another general embodiment of the inventive power source apparatus or system.

A control module for a power system is provided to activate and regulate one and, more often, a plurality of modules comprising the power system, such as a power system 220 shown in FIG. 5 comprising power electronics, energy storage and alternative power generation. In the power system 220 shown in FIG. 5, for example, a control module 221 interacts with the plurality of power system modules including an energy storage module 1000, a power conditioning module 1010, an AC interconnection module 1020, and an optional generation module 1030 (shown in the FIG. 5 embodiment as an optional DC-connected generator 1032). Power system 220 with control module 221 operates off-line and is advantageously capable of accommodating power levels at any range within the 5 to 40 MW range and operating at the electrical substation level. However, in light of the description below, it is to be understood that embodiments of the invention may apply to a variety of power levels including ranges below 5 MW and above 40 MW as well as within the range between 5 MW and 40 MW.

Figure 6:
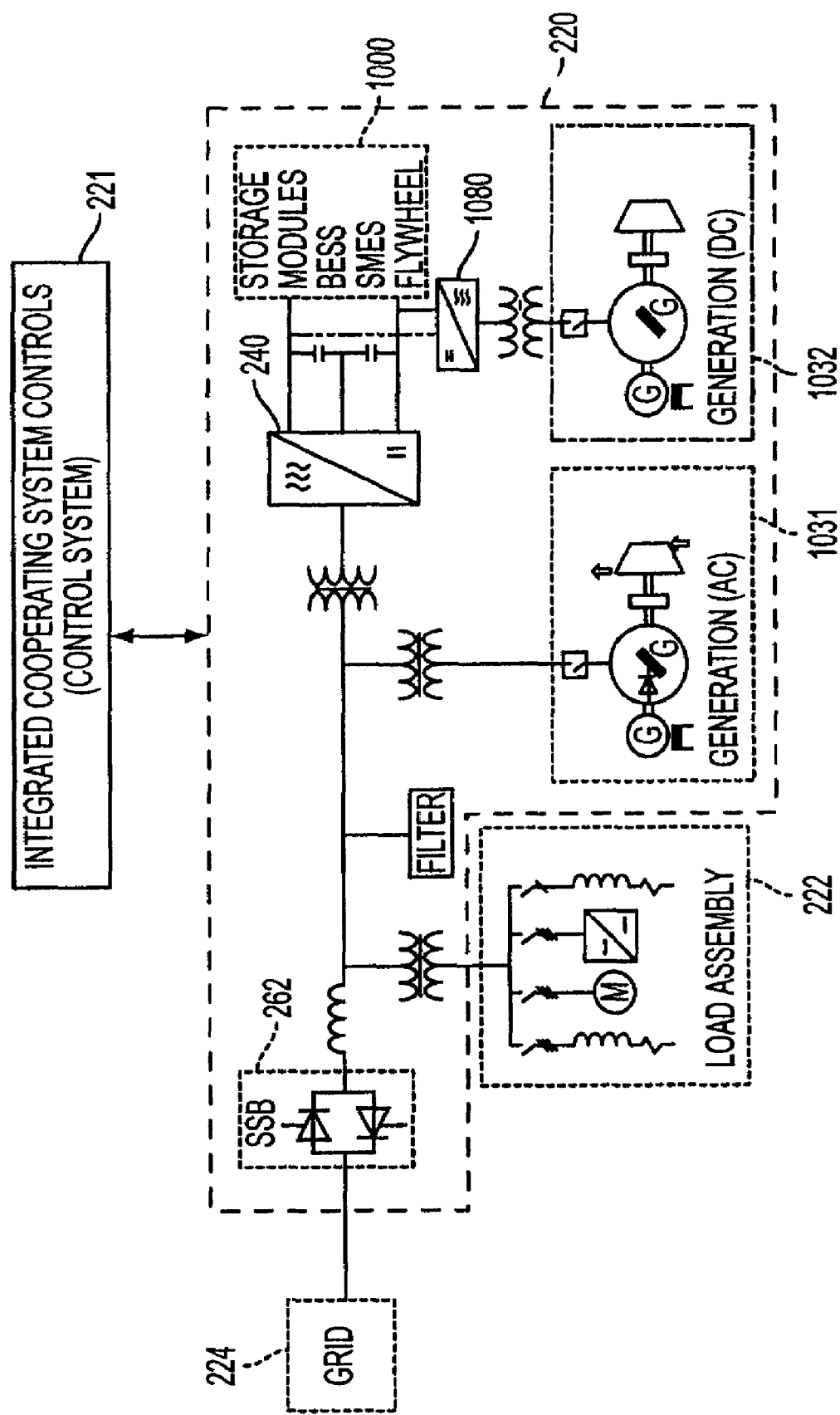
FIG. 6 depicts a simplified block diagram of another embodiment of the inventive power source apparatus or system with integrated voltage source controller.

Power system 220 may also provide reactive support of electrical systems (or VAR support). To provide VAR support, for example, a STATCOM, or static synchronous generator utilizing a voltage source converter (VSC) may be provided, as shown in the embodiment of FIG. 6. FIG. 6 depicts an exemplary power system 220 comprising a STATCOM utilizing VSC 240 in series with solid state breaker (SSB) 262, and control system 221. Energy storage module 1000 is connected to VSC 240. During system transients, such as generation-rejection and/or load-rejection, the VSC 240 capabilities are to be utilized to support the load assembly within the specified capabilities of the converter. Further, FIG. 6 depicts two embodiments of generation module 1030—an AC-connected gen set 1031 and a DC-connected gen set 1032. The use of a DC-connected gen set requires additional controlled rectifier 1080. The main advantages of a DC-connected generator over an AC-connected generator include: no gen-set synchronization prior to load take-over (quicker load pick up), reduced impact to remaining loads upon sudden changes in load, and simpler coordination between storage system and prime mover.

Various specific embodiments of the different modules discussed above have different specific control variables and control systems. In one embodiment, for example, the control module 221 includes a base system control module and one or more device-specific modules that individually or collectively correspond to one or more of the individual power system modules, for example the energy storage module 1000, the power conditioning module 1010, the AC interconnection module 1020, and the generation module 1030. Thus, in addition to the system 220 allowing for technology independent modules to be used, the control system includes independent control modules designed to control a particular module or device of the system 220. If the energy storage module 1000 includes battery energy storage (BES), an individual control module specifically designed to control the BES can be used along with the base system control module of the control system 221. If the energy storage module 1000 includes a superconducting magnetic energy system (SMES), however, the control system includes a different module designed to control the SMES, and so forth.

In one embodiment the individual modules of the system 220, including for example the modules of the control module 221, are advantageously but optionally designed to allow for "plug-and-play" interchanging of control modules. In this embodiment, the control module 221 enables different system applications to be implemented by "plugging" various alternative control modules into a base system control module, and setting the module-specific variables and/or parameters or control values and rules. "Plugging" for the purpose of the present invention can include specially designed hardware and/or software that may be physically plugged into or otherwise operatively connected to or coupled with a base system control, or the base system control module may include standard hardware and/or software that may be reprogrammed or selected from a menu of options for a particular module or device of the system. Thus, a plug-and-play base system control module allows for possible expansion, reduction, or exchange of control modules as dictated by the primary configuration of the system 220. It also facilitates maintenance with little or no disruption of operation or down time.

Figure 7A:
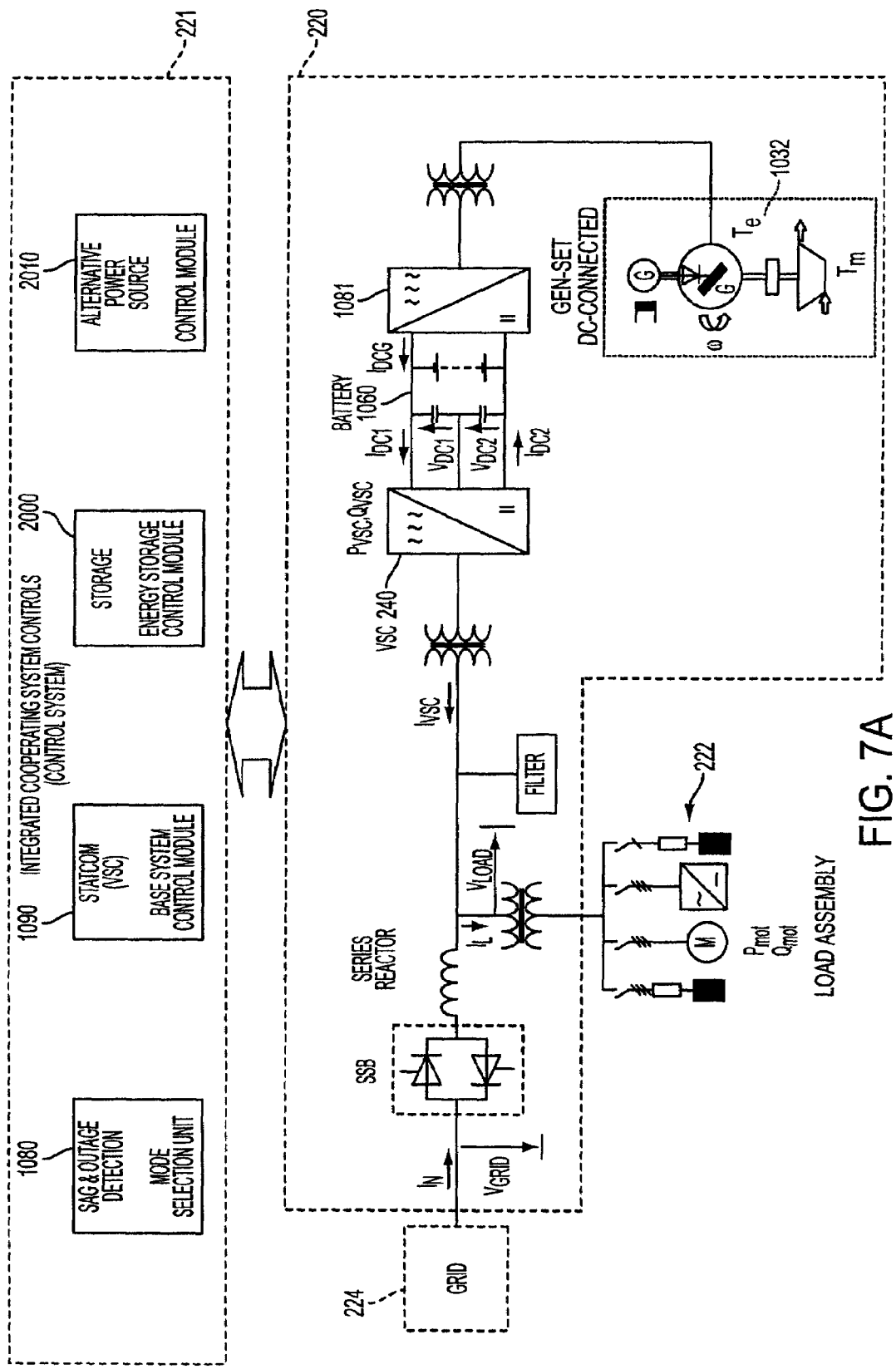
FIG. 7A depicts a simplified block diagram of another embodiment of the inventive power source apparatus or system with multimode control and operation.
Figure 7B:
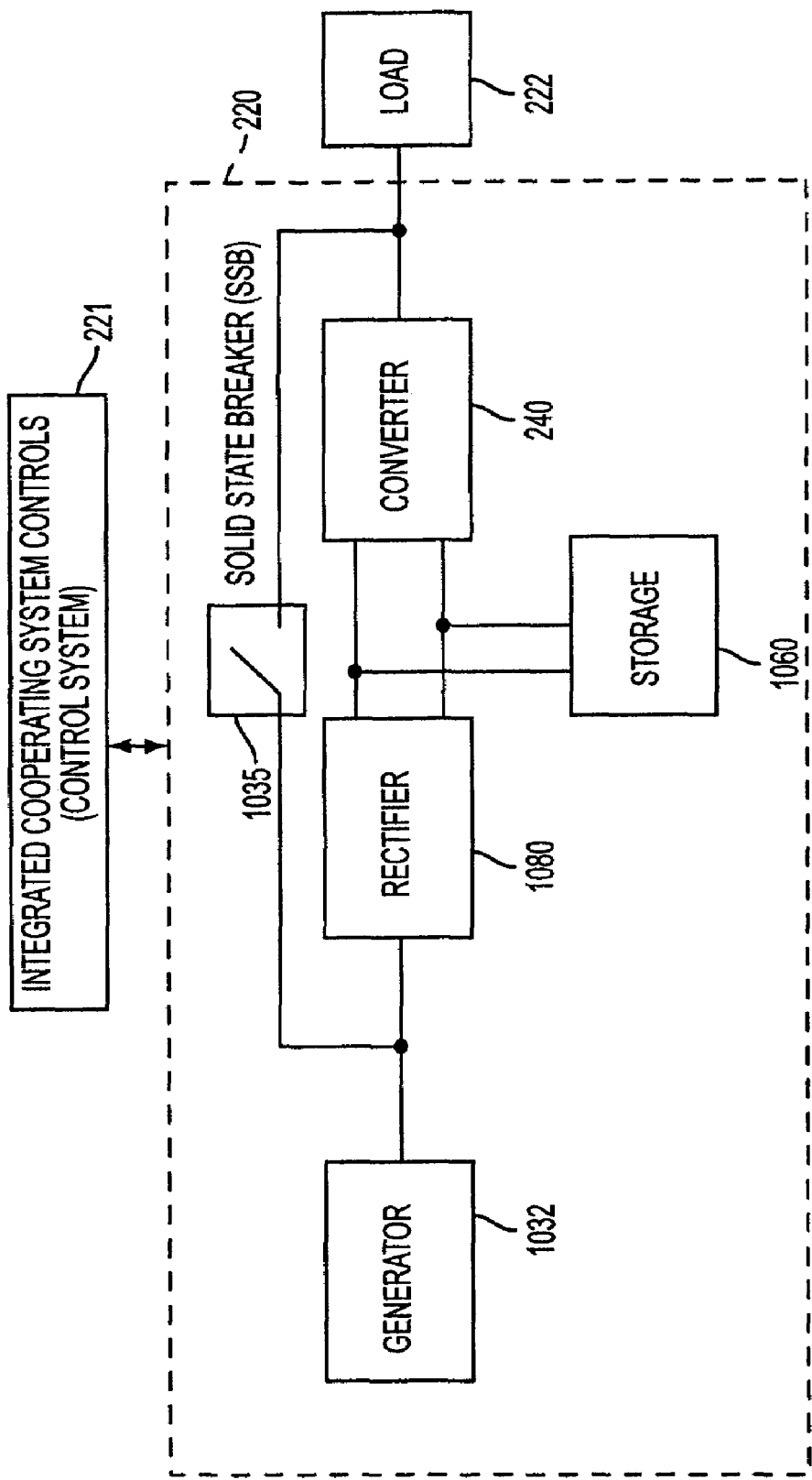
FIG. 7B depicts a simplified block diagram of another embodiment of the inventive power source apparatus or system.

One particularly advantageous embodiment of power system 220 is shown in FIG. 7A, utilizing lead-acid battery 1060 as energy storage module 1000 and a DC-connected Gen set 1032 as generation module 1030. Control module 221 advantageously incorporates mode selection unit 1080, base system control module 1090, energy storage control module 2000, and alternative power source control module 2010. An alternative embodiment showing a DC-connected generator is illustrated in FIG. 7B.

In this embodiment, the energy storage control module 2000 is a battery energy storage (BES) control module, and the alternative power source control module 2010 is suitable for control of a DC-connected Gen set 1032, as depicted. As described above, the individual control modules 2000 and 2010 are optionally plug-and-play modules that may be interchanged as needed. Thus, if the battery 1060 in the system is replaced by another different energy storage device, such as an SMES device, the battery energy storage control module may be replaced (either with a new hardware and software control module or by reprogramming the control module) with an alternative energy storage control module that is specifically designed to control the SMES device. Similarly, if a different type of battery is used, such as a Sodium Sulfur battery, the battery energy storage control module may be replaced or reprogrammed to provide the specific charge and discharge control needed by the Sodium Sulfur battery. Control modules may alternatively be universal and switched between programs or modes to suit the present application. It is to be understood that FIG. 7A illustrates one embodiment of the inventive system for the purposes of further specific discussion, and that the inventive concept, system, and method are applicable to a variety of specific embodiments.

Battery energy storage control module 2000 may include battery supervision and battery management systems to be provided by the chemical battery supplier. These features may desirably incorporate battery-type and battery-cell specific knowledge for beneficial usage and prolonged life time. Battery conditioning in the form of specific charge and discharge treatment is advantageously but optionally implemented in the charge-control and discharge-control functions of the control system. Charge and discharge control function parameters are available, for example, in form of battery models, charge and discharge characteristics, or other characteristics as needed for control of the battery and as known in the art.

Diesel Gen sets, such as Gen set 1032, are known in the art, having a control package reflecting Start/Stop controls, fuel injection system, and generator excitation control. The interface and signal exchange are defined in the context of the components and operation controls present. The DC connection of Diesel Gen set as such requires a rectifier, such as rectifier 1081, for which control system 221 incorporates control means to provide the required steady state and transient performance.

FIG. 7B depicts another advantageous embodiment of the DC connection of a generation module, in which a controlled, solid state breaker 1035 is utilized to bypass rectifier 1080, storage module 1060, and converter 240 in the event that additional fault clearing current is needed to operate fault clearing devices in the connected load 222. Solid state breaker 1035 is controlled by control system 221 and is closed to provide a temporary AC-connection for the gen set 1032 in the event of a fault on the load side. After the fault has cleared breaker 1035 is re-opened and the system returns to normal operation.

Figure 8A:
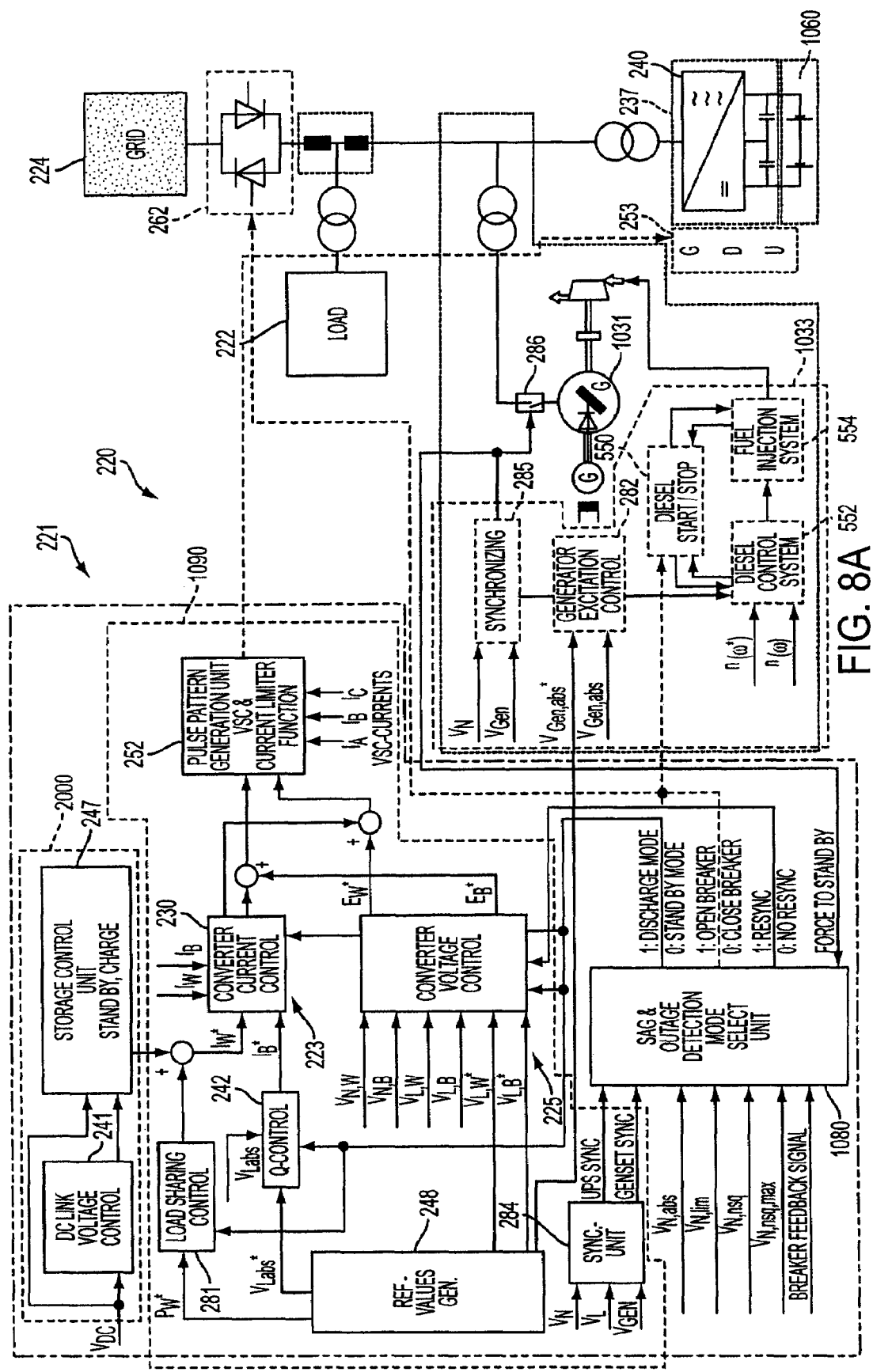
FIG. 8A depicts a simplified block diagram of one implementation of one embodiment of the inventive power source apparatus or system with multimode control and operation.

FIG. 8A depicts a block diagram of one embodiment of a power system 220 with multimode control and operation facilitated by control system 221, comprising battery 1060 as energy storage module 1000, and an AC-connected Gen set 1031, with associated packaged generator controls 1033, as generation module 1030. Portions of the control structure depicted correspond to the individual control modules shown in FIG. 7A. Energy storage control module 2000 comprises DC link voltage control 241 and storage control unit 247. For an electrochemical battery control unit 247 may advantageously comprise, FIG. 8B, a battery voltage control unit 244, switch 246, battery current control 245, and battery management system 243. STATCOM (VSC) control module 1090 comprises several control units including load sharing control 281, reference value generator 248, Q-control 242, a current control system 223 including VSC current control 230, a voltage control system 225 including VSC voltage control 232, and pulse pattern generation unit 252. The alternative power source control module 2010 in one implementation of this embodiment comprises controls 1033 associated with the AC-connected gen set 1031 including a synchronizing unit 285, generator excitation control 282, diesel control system 552, diesel start/stop unit 550, and fuel injection system 554. The control units comprising the alternative power source control module 2010 are typically determined by the type of power source employed, and are known in the art. Control system 221 is advantageously capable of interfacing with alternative power source control module 2010. The energy storage control module 2000, the STATCOM control module 1090, the sag and outage detection module 1080, and the alternative power source control module 2010 are advantageously further designed to allow for "plug-and-play" interchanging of the control modules with the control system 221, or reconfiguration within a specific control module, so that the control system 221 may be easily modified if any of the system modules are added or removed from the system 220.

Figure 8B:
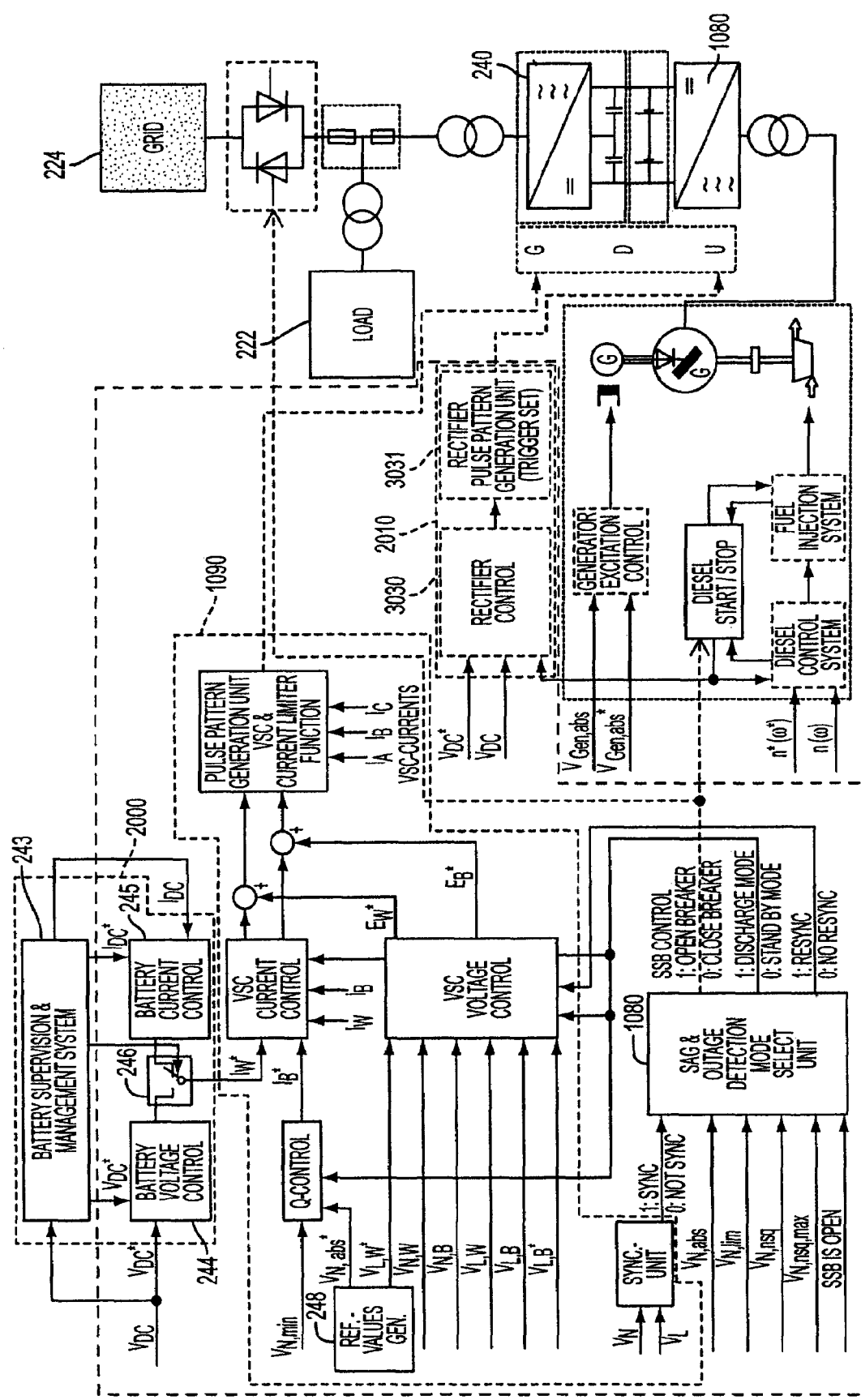
FIG. 8B depicts a simplified block diagram of one implementation of one embodiment of the inventive power source apparatus or system with multimode control and operation.

FIG. 8B depicts another embodiment of the control structure in the case where a DC-connected gen set serves as generation module 1030. The control structure is similar to that illustrated and described relative to FIG. 8A, and further includes the alternative power source control module 2010, comprising rectifier control 3030 and rectifier pulse pattern generation unit 3031 associated with additional rectifier 1080. As for the AC-connected gen set embodiment with an electrochemical battery, energy storage control module 2000 comprises battery voltage control unit 244, switch 246, battery current control 245, and battery management system 243. Further, in the case of a DC-connected gen set as in FIG. 8B, synchronizing unit 285 and load sharing control, depicted in FIG. 8A, are unnecessary. The energy storage control module 2000, the STATCOM control module 1090, the sag and outage detection module 1080, and the alternative power source control module 2010 are advantageously further designed to allow for "plug-and-play" interchanging of the control modules with the control system 221, or reconfiguration within a specific control module, so that the control system 221 may be easily modified if any of the system modules are added or removed from the system 220.

Power source system 220 is configured to compensate for voltage disturbances and power interruptions on a power grid or utility line 224 by providing power to one or more loads 222 when a disturbance or interruption occurs. The apparatus employs a multimode control system 221 which allows the power source system 220 to cooperate and control a plurality of operational modes. In one embodiment, the system 220 is capable of either injecting or absorbing reactive power thus operating as or substantially as a static compensator (STATCOM mode) without actually having the structure or components of a conventional static compensator or STATCOM. The system 220 and associated method is further capable of at least compensating for short term voltage disturbances and power interruptions, in effect, operating as an uninterruptible power supply (UPS); and further the system and method are also be capable of supplying longer term power to the load through an electrical generator such as an engine-driven electrical generator (gen set). The control system 221 and method may advantageously be included within power source system 220 which provides functionality and control for system 220 to operate in any one of or combination of the plurality of operational modes as well as controlling transitions between operational modes. The control system enables two or more modes to operate at the same time to provide more stable power to the loads. The controlled transitions between operational modes greatly improves the reliability of the power received by the load. Furthermore, continuity of operation of highly sensitive loads is assured. Thus, the power source system 220 maintains power sensitive loads, such as semiconductor manufacturing facilities, other manufacturing facilities, data service centers, server farms, hospitals, emergency centers or other sensitive loads, with uninterrupted power.

The control system 221 provides for continuous uninterruptible power supply and/or generation by means of an integrated, cooperative control scheme. The control system 221 enables operation of a voltage source converter (VSC) 240 simultaneously with a source of stored energy (storage module 1000) and alternate power generation system 1030 to control the load voltage (frequency and amplitude) by injecting or absorbing both active and reactive power during all operating modes. Injection or absorption of real or reactive power are determined by the needs of the load 222 as well as any applicable performance limitations of the subsystems, for example, the available capacity of storage module 1000.

The multimode control system or integrated closed loop control 221 provides control for the STATCOM, UPS, and gen set modes of operation. In one embodiment, either the current control 223 or the voltage control 225 is activated at one time, such that the current control 223 is active when the system 220 operates in standby mode, charge mode, and discharge mode with the gen set. The voltage control 225 is active in discharge mode without the gen set. The control system 221 provides optimal power (or near optimal power) to a load by coordinating the operation of the plurality of modes, including operating two or more modes simultaneously.

The control system 221 provides for operation of power system 220 in one of three modes—standby mode, discharge mode, or charge mode—as well as for minimally disruptive transitions between and among any of these modes. The control system 221 allows the power system 220 to act either as a current source or a voltage source. When acting as a current source, for example, the control system 221 allows for simultaneously sharing the load 222 among multiple energy sources, for example a generation module 1030, such as gen sets 1031 or 1032, and a storage module 1000 such as a battery 1060.

Figure 9A:
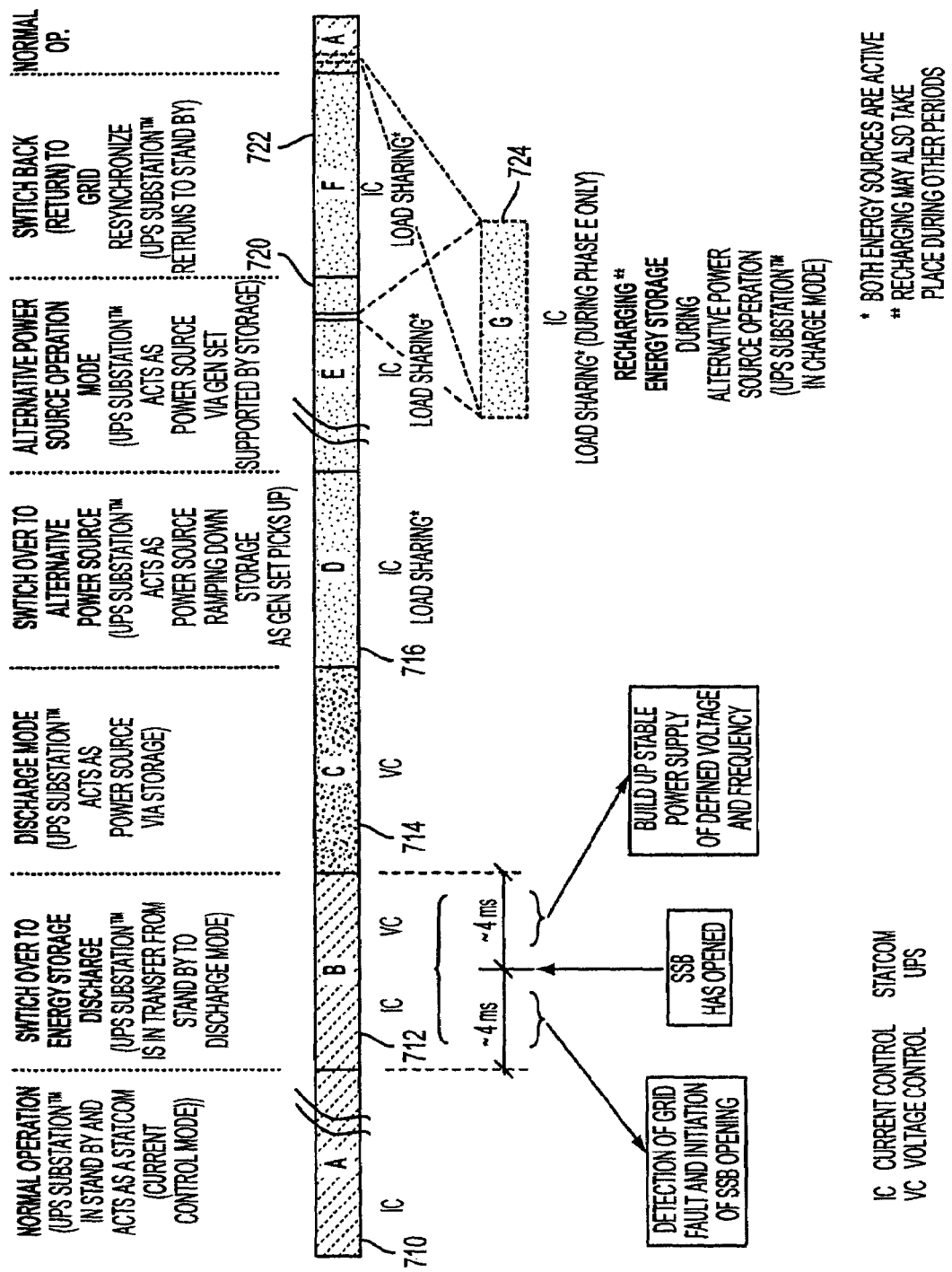
FIG. 9A depicts a simplified flow diagram of one embodiment of the control modes, the transitions between modes, and parameters associated with the modes.

FIG. 9A depicts a simplified flow diagram 700 of the control modes according to one embodiment of the invention, the transitions between and among modes, and parameters associated with the modes. Specifically, FIG. 9A depicts modes supported by control system 221 in an embodiment of power source system 220 comprising an AC-connected gen set, such as the embodiment depicted in FIG. 8A.

The control system operates generally as follows. During normal operation of the grid or utility 224, power system 220 is operated in mode A, stand-by mode (block 710), acting as a STATCOM, and voltage support is provided by VSC 240.

When the interconnected utility grid is unable to supply proper power (voltage, current or combination of voltage and current), the control system operates in mode C, discharge mode (block 714), providing power to the load from the storage unit 1000 and/or alternative power generation, such as the AC-connected gen set 1031 in one embodiment. In this mode the control system operates to provide a full alternative power supply.

More specifically, in the event of a grid 224 fault, that is when the grid is unable to supply a proper voltage, current, or power requirement, the power system 220 enters mode B (block 712), a transition mode between standby and discharge modes. In this transition mode, referring to FIG. 8A, the SSB 262 via the Sag and Outage Detection module 1080 is commanded to disconnect the load 222 from the feeding bus and supply it from the energy storage module 1000, such as battery 1060, within a specified time frame. In discharge mode, block 714, the storage module 1000 supports the load 222 for a period of time, after which time the load 222 will be transferred to the alternative power source during mode D (block 716), a transition between discharge and alternative power source generation mode (block 720). In block 720, then, power to load 222 is supplied by the generation module 1030, such as gen set 1031, if a generation module is included in power source system 220. The power system 220 transformer advantageously remains energized at all times to achieve fast response and to recharge energy storage module 1000 utilizing VSC 240. The energy for recharging storage module 1000 may either be derived from the main power source, for example from the utility 224, or from the alternative power source in the generation module 1030, such as gen set 1031. If a generation module 1030 is not included in power system 220, control system 221 issues a set of commands to disconnect the load after a period of time in discharge mode. If power transfer to the generation module 1030 is not necessary, control module 221 resynchronizes the load 130 to the recovered utility 112 (see return to grid block 722).

Figure 9B:
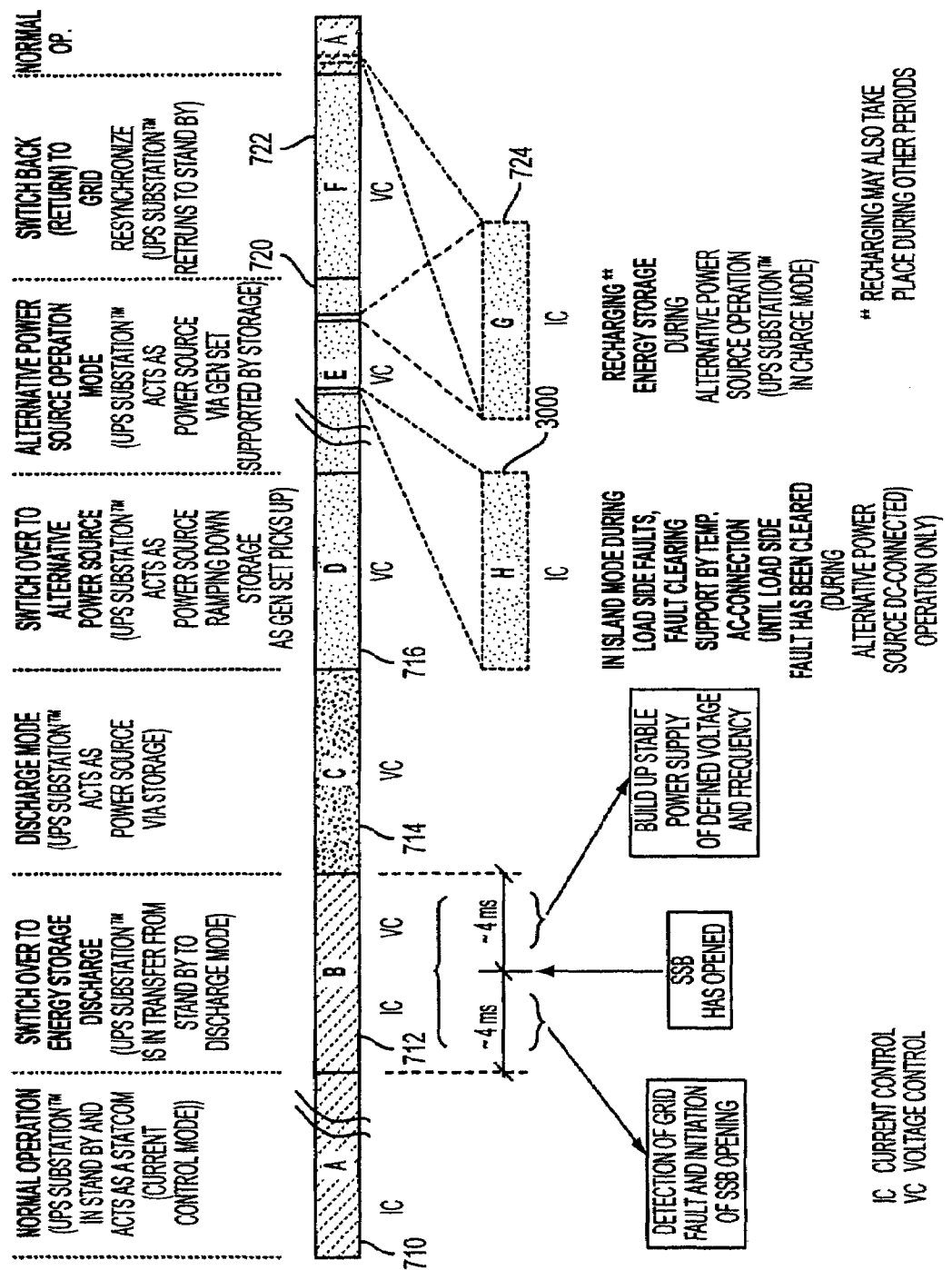
FIG. 9B depicts a simplified flow diagram of another embodiment of the control modes, the transitions between modes, and parameters associated with them.

For further clarification purposes, FIG. 9B is provided to illustrate operating modes and transitions of another embodiment of control system 221, specifically an embodiment comprising a DC-connected gen set, such as in FIG. 5B. The modes are substantially the same as FIG. 9A with the addition of mode H, block 3000. This additional H-mode is advantageously provided to support a temporary AC-connection, FIG. 7B, for the gen set 1032 in the event of a fault on the load side.

Following is a more detailed discussion of the various modes of operation illustrated in FIGS. 9A and 9B. Section headings are intended only as a guide for the reader and are not to be understood in any way as limiting the inventive concept, as information about various aspects of the invention can be found throughout the sections and elsewhere in this description.

Standby Mode (STATCOM Mode)

The standby mode step A (710), for example as shown in FIG. 9A, is the dominant operational mode for the power source system 220, during which it acts as a STATCOM, keeping the load voltage within a narrow band. The power source system 220, for example, can maintain the load voltage within .+−.15% of the steady state load voltage, preferably within .+−.10% of the steady state load voltage, and more preferably within .+−.5% of the steady state load voltage. The system 220 may also supply a small amount of real power to offset losses incurred by the storage unit 1000 and to maintain the storage unit 1000, such as the battery 1060, at an appropriate energy, e.g., charge, level. During standby mode, the system 220 is under current control (as designated in FIG. 9A by "IC" where the letter "I" designates current and the letter "C" control), and the interconnected utility grid supplies the load and the system 220 acts as a current source.

During Stand-by operation mode, the energy storage module is maintained at the desired state of charge. The VSC 240 provides real and/or reactive power to the system as required, or compensates for moderate voltage fluctuations. The VSC advantageously maintains voltage at an optimum level with reactive power generation or absorption and a small amount of active power to compensate for the losses of the attached energy storage system.

Typically, during standby operation, the system 220 maintains energy storage module 1000, comprising in one embodiment battery 1060, FIG. 8A, at substantially a full charge. However, in another embodiment, storage module 1000 is maintained at less than full charge, for example 10% to 20% below full charge (or at any other predetermined or dynamically determined charge), to accommodate special operating modes such as oscillation damping on the grid 112. Alternatively or additionally, the control system 221 allows for a constant load power factor, voltage spike protection, and harmonic cancellation.

In standby mode (block 710), for example as shown in FIG. 9A, the sag and outage detection unit 1080 acts as a watchdog to detect system disturbances. This may be performed by sensing the line-to-ground AC system voltages. In such a case the signals to be evaluated may include the absolute values, the positive phase sequence component, the negative phase sequence component, and/or substantially any other metric indicative of AC system voltage such that the unit can quickly detect a supply voltage decrease/increase, a sudden increase in the negative phase sequence component, and steps or changes in phase angle. From these circumstances, the sag and outage detection module 1080 could determine that a system (grid) fault is present and initiate further action. The control system discriminates between load side and system side faults and initiates appropriate actions.

In one embodiment, the energy storage module 1000 comprises one or more energy storage components or devices, or a combination of components for storing energy including chemical storage cells, capacitors, electrochemical capacitors, superconducting magnetic energy storage (SMES), flywheels, compressed air energy storage (CAES), and/or substantially any other storage component known in the art. The storage device, such as battery 1060, is part of an energy storage system 1000. In one embodiment, the storage system 1000 further includes a voltage source converter (VSC) 240 coupled with the storage device, e.g., battery 1060, via an internal DC link or other link. The VSC 240 further couples with the grid 224 through a solid state breaker unit (SSB) 262. The VSC 240, as directed by the current control, is capable of drawing power from the grid 224 (or a generator source described elsewhere herein and below) for charging the storage device, e.g., the battery 1060, as well as supplying power to the load 222 from the storage device. The VSC 240 further maintains the voltage of the storage unit 236 at an optimum or near-optimum level with absorption of active power to compensate for the losses of the attached energy storage device 1000. In one embodiment, a storage control unit 247 and an optional DC link voltage control, FIG. 8A, are utilized to match the terminal characteristics of the storage unit 1060 (voltage, current, and/or frequency) with the requirements of the VSC DC link, typically dependent on the electrical behavior of the storage device implemented.

STATCOM operation is available in standby mode, in part, through a Q-controller 242 which aids in the control of the reactive power provided to/from the VSC 240. The Q-controller 242 couples with a reference value generator 248 which supplies an amplitude reference load voltage $V_{L,abs}$ where the subscript "L,abs" is indicative of an amplitude of the load voltage. In the description provided here, the asterisk "*" indicates a reference or set point voltage or current and a voltage or current without the asterisk "*" indicates a related actual or sensed voltage or current. Q-controller 242 is further coupled with the converter current controller 230. Based on a comparison between the reference amplitude load voltage $V_{L,abs}*$ and the feed back of the amplitude of the load voltage $V_{L,abs}$, the Q-controller generates a reference converter reactive current $I_B*$ which is supplied to the current controller 230. The actual reactive converter current $I_B$ is fed back to the converter current controller 230, where, in one embodiment, the reactive converter current $I_B$ is proportional to converter reactive power as compensated by the VSC 240.

In one embodiment, the output of the converter current controller 230 is connected to the pulse pattern generation unit 252. The pulse pattern generation unit 252 is connected to a gate drive unit (GDU) 253 in the VSC 240, where the pulse patterns are transformed into gate drive signals of the VSC 240. The pulse pattern generation unit 252, through the GDU, switches or triggers on and off the power semiconductors in the VSC 240. By controlling the time that each power semiconductor in the VSC conducts, both the magnitude and the phase angle of the resulting VSC AC output voltage are controlled. This provides independent control for both active and reactive power. Embodiments of the invention provide different or combinations of control, such as providing a pulse pattern generation unit 252 that generates pulses according to pulse width modulation techniques (PWM methods), modified PWM methods, optimized pulse pattern techniques (OPP methods), or substantially any other pulse modulation technique known in the art, extensions of such techniques or new techniques developed in the future. The choice of pulse modulation or pulse pattern technique may typically be dictated by the type of semiconductor used in the VSC, switching frequency, and the objectives of harmonic elimination and reduction of total harmonic distortion (THD) or the like factors or combinations thereof.

In one embodiment, the pulse pattern generation unit controls the VSC 240 such that the actual converter reactive current $I_B$ exchanged (i.e., current injected or absorbed) follows the value set by the reference converter reactive current $I_B*$. Injection or absorption of reactive current acts to control the amplitude of the load voltage, $V_{L,abs}$, to the desired set point value $V_{L,abs}*$. Reactive power flow is controlled by the magnitude of the VSC AC (fundamental) voltage relative to the magnitude of the load (or system) AC voltage $V_{L,abs}$. If the VSC voltage is less than the load voltage, the converter absorbs reactive power. Conversely, if the VSC voltage is higher than the load voltage, the VSC injects reactive power.

Figure 13A:
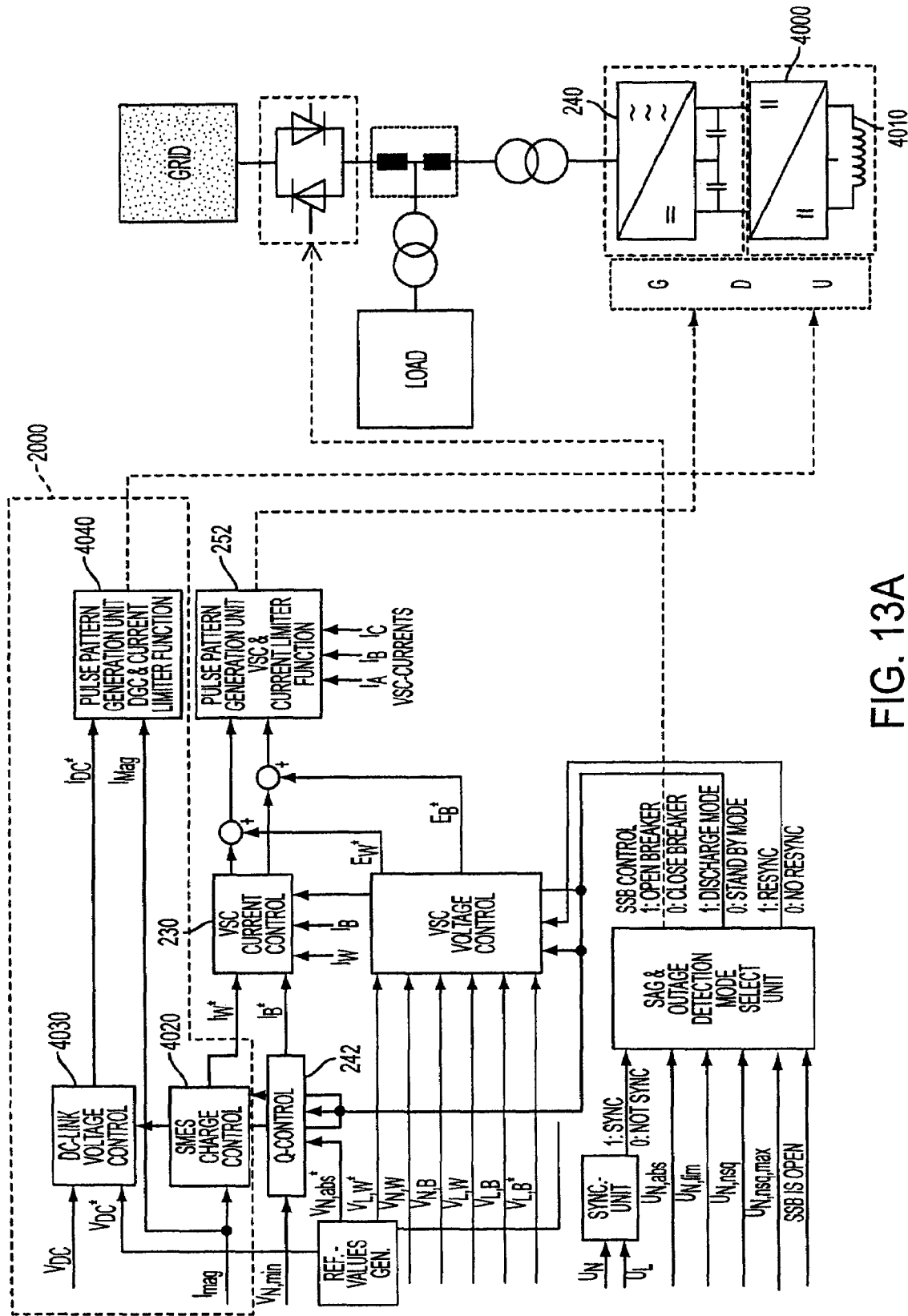
FIG. 13A depicts a simplified block diagram of one implementation of one embodiment of the inventive power source apparatus or system with a SMES energy source.
Figure 13B:
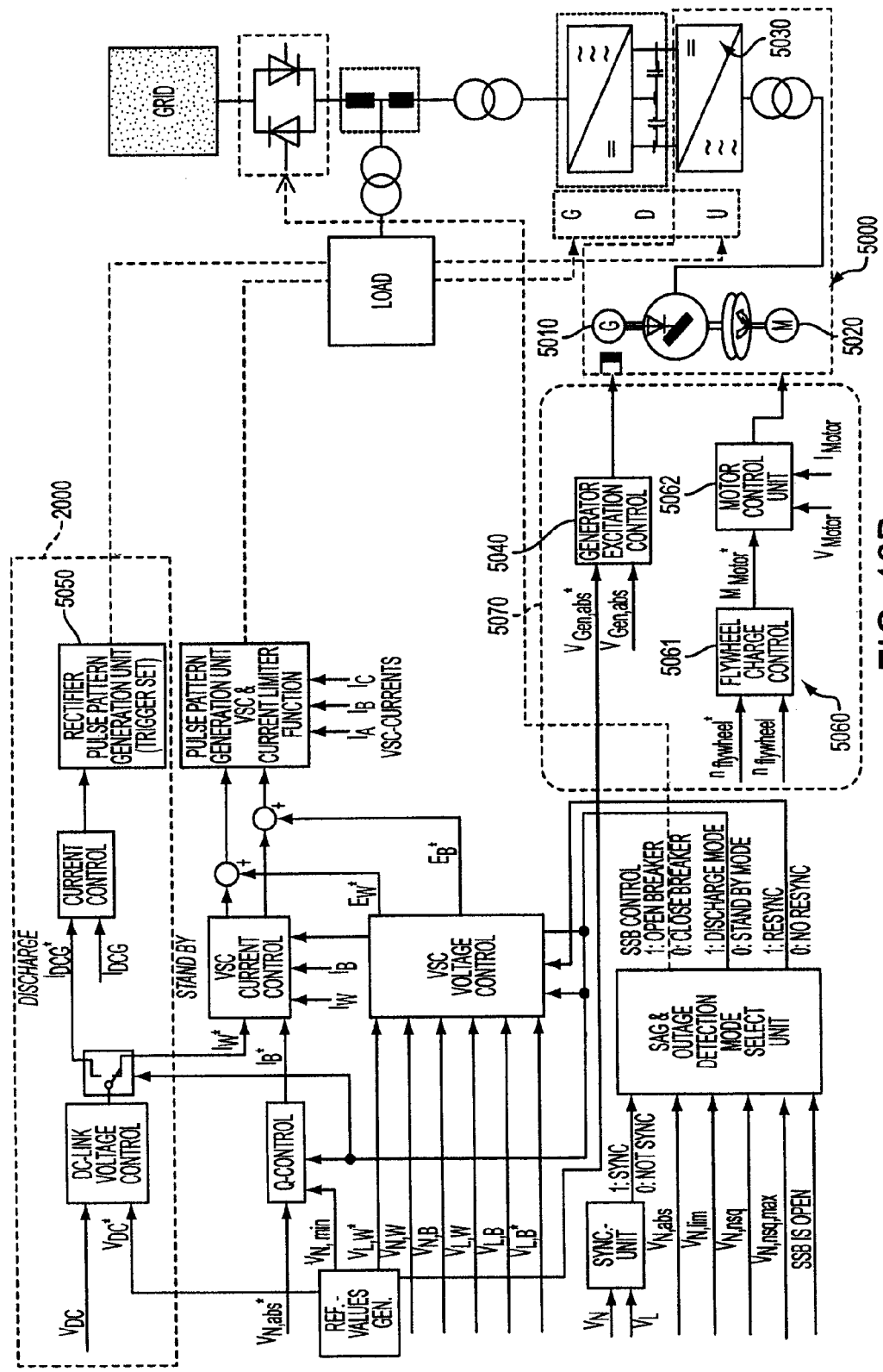
FIG. 13B depicts a simplified block diagram of one implementation of one embodiment of the inventive power source apparatus or system with a flywheel energy source.

The utilization of VSC 240 as a STATCOM, as well as addition of energy storage systems connected to the VSC DC-link requires in most cases a DC link voltage controller (see, for example, FIGS. 8A, 13A, and 13B). The DC link voltage controller operates advantageously to keep the DC link voltage constant and compensate for internal losses.

In one embodiment, in which a SMES is utilized as the energy storage module 1000, FIG. 13A, the DC link voltage controller 4030 operates advantageously to maintain DC link voltage by means of discharging or charging the magnet via a DC Chopper (DCC). In one implementation of this embodiment, the DC link voltage controller 4030 adjusts the input $I_{DC}*$ of the pulse pattern generation unit 4040 of the DCC, such that the DCC discharges or charges the magnet to restore the DC link voltage.

In another embodiment, in which a flywheel is utilized as the energy storage module 1000, FIG. 13B, the DC link voltage controller operates advantageously to control the VSC DC link voltage by generating a reference current $I_W^*$ by comparing voltage $V_{DC}$ with the reference voltage $V_{DC}^*$. The flywheel speed is also kept constant during standby by the flywheel charge control 5061.

In one embodiment, an exception to the requirement for a DC link voltage controller may be realized when the storage module 1000 comprises a chemical battery 1060. In one implementation of this embodiment, the DC-link voltage is defined by the voltage and current (V/I) characteristic of the battery. A DC-link voltage is applied to a battery management system 243 which provides a reference DC-link voltage $V_{DC}^*$ to a battery voltage control unit 244. The battery voltage control unit further receives the DC-link voltage $V_{DC}$ for comparing the DC-link voltage $V_{DC}$ and the reference DC-link voltage $V_{DC}^*$. The battery management system 243 couples with a battery current control unit 245, and supplies a reference DC-link current $I_{DC}^*$ to the battery current control unit 245. The battery current control unit 245 further receives a DC-link current, and generates a setpoint reference active current $I_W^*$ based on the comparison between the reference DC-link current $I_{DC}^*$ and the DC-link current $I_{DC}$. Both the battery voltage control unit 244 and the battery current control unit 245 couple with a switch 246 which is controlled by the battery management system 243 depending on the mode of operation to provide at least the reference active current $I_W^*$ to the VSC current control 230.

An active current $I_W$, proportional to the active power exchanged with the system through the VSC 240, and a reactive current $I_B$, proportional to the reactive power exchanged with the system, are also fed back to the converter current controller 230. Based on comparisons between the reference reactive converter current $I_B^*$ and the reactive converter current IB, as well as between the reference active current $I_W^*$ and active current $I_W$, the current controller 230 controls the VSC 240 to exchange active power with the storage unit 236, to maintain its charge, and/or to exchange reactive power with the storage unit (STATCOM operation).

The output of the converter current controller 230 is coupled with the pulse pattern generation unit 252. The pulse pattern generation unit 252, in one embodiment, triggers drive circuits of power semiconductor of the VSC 240, as described above, dictated by the converter current controller output.

Figure 10:
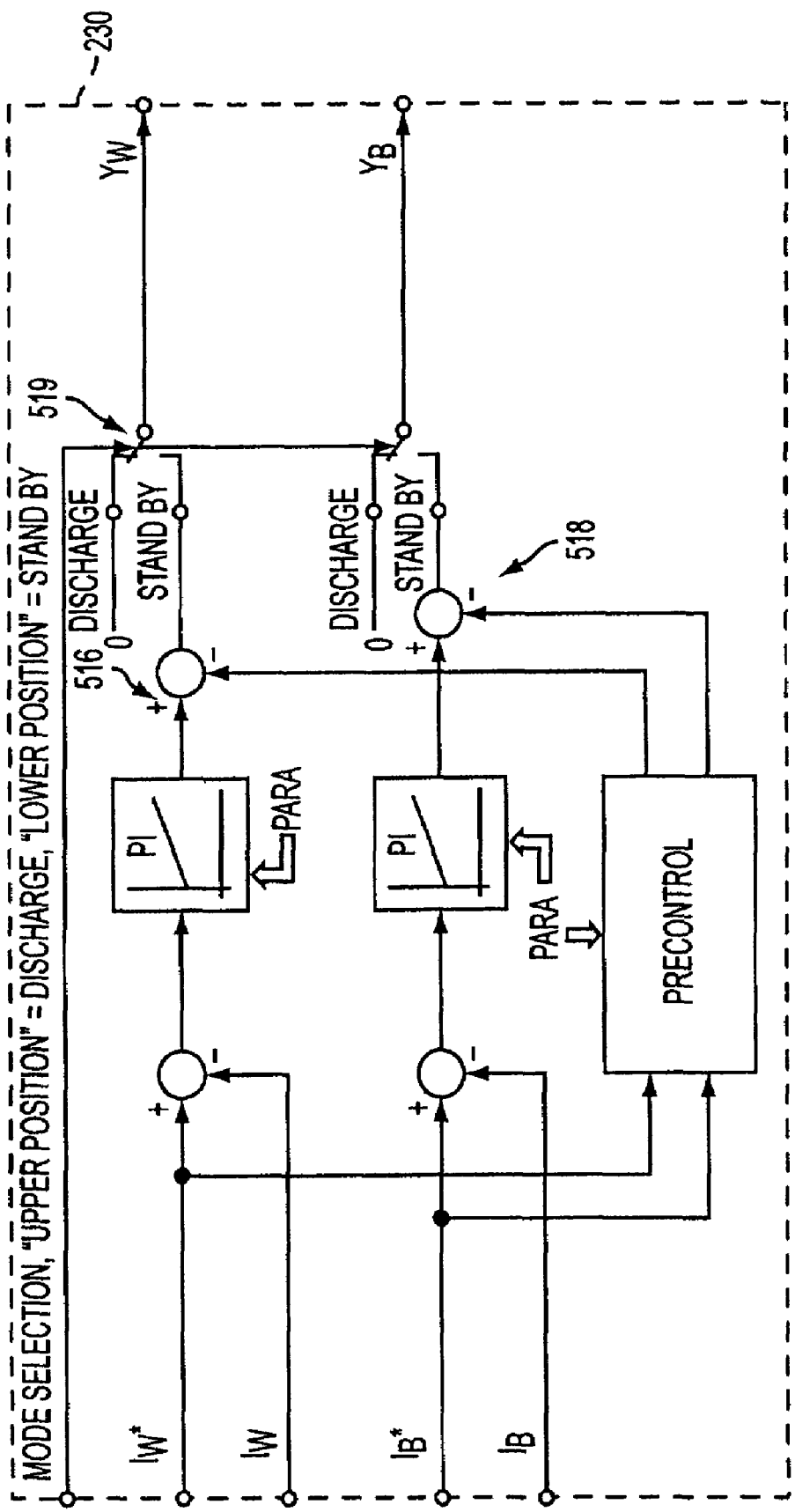
FIG. 10 depicts a simplified block diagram depicting one implementation of one embodiment of the converter current controller.

FIG. 10 depicts a simplified block diagram of one embodiment of the converter current controller 230. In another embodiment, the current controller is a standard closed loop controller, as known in the art. In one embodiment, the VSC current control 230 is composed of two Proportional Integral (PI) type feedback control circuits, a first control circuit 516 computing the active component $Y_W$ and a second control circuit 518 computing the reactive component $Y_B$ of the current. In one embodiment, the space vector theory is used to derive the real and reactive current components. Space vector theory, as known in the art, allows one to describe three linearly dependent quantities, such as, three voltages or three currents, in the generalized form of classical phasor representation, by using only two linearly independent quantities represented in an orthonormal coordinate system. The voltage drop of the VSC transformer is calculated via pre-control. The VSC current controller is disabled 519 in discharge mode.

In one embodiment, a requested converter current vector (outputted from the converter current controller) is translated into a pulse pattern by the pulse pattern generator by means of a PWM (pulse width modulation) trigger set or other such trigger-sets including optimized pulse pattern (OPP) trigger-sets.

The trigger set is a means to generate power semiconductor individual trigger signals. In one embodiment, permanent pulses are used, with a pulse length equivalent to the expected conduction period of the individual switch. Electrical potential de-coupling may be obtained by applying optocouplers and fiber optics or other isolation means. In one embodiment, individual switch interlocking (to consider minimum "on" times and minimum "off" times and prevent a short circuited DC link capacitor) is utilized.

Discharge Mode (Island Mode, Storage Conditioning)

During the operation of power source system 220, a sag and outage detection and mode selection unit 1080 monitors the grid 224 for power faults, such as, voltage sags, interruptions, outages and other such faults. The outage detection and mode selection unit 1080 further determines where the fault is located (i.e., the grid side or the load side). The detection and mode selection unit 1080 couples with a grid SSB or switch 262. In the event the detection and mode selection unit 1080 detects a fault on the grid, the detection and mode selection unit opens the grid SSB 262 disconnecting the grid from the load. The control system 221 transfers power source system 220 into discharge mode in step B (712) after a sag or outage has been detected and the disturbed grid 112 has been disconnected, that is SSB 262 has been opened. The system 220 may utilize a series reactor between the VSC 240 and the load bus, or in other configurations as known in the art, such as a duplex reactor, in order to allow for current injection during the period between fault initiation and SSB 262 opening. Further, the detection and mode selection unit 1080 couples with and activates the converter voltage controller 232 in the event a fault is detected on the grid 224. The detection and mode selection unit 1080 further signals to deactivate the converter current controller 230. The converter voltage controller 232 signals the pulse pattern generation unit 252 which activates the VSC 240 and storage unit, such as battery 1060, to take over and supply full power to the load. Subsequent to opening of the SSB (isolation of the load from the grid) the system 220 begins operating as a voltage source. During transfer period 712 the control system 221 allows for this transition from current control (IC) to voltage control (VC).

For example, after fault detection, the SSB is opened within approximately 4 ms or other suitable time period at which point the control shifts from current to voltage control. Following the opening of the SSB, the power supplied by the system 220 is built up to a stable level within the time period (approximately 4 ms). The time of 4 ms provides for advantageous implementation of power system 220, however, any other timing values may be utilized. For example, a time period of between 1 ms or less and about 20 ms may frequently be used though times of between 4 ms and 8 ms are more usual, as well as other timing values. (FIG. 14 describes data for a 6 ms time period.)

Discharge mode is entered in step C (block 714), where the actual load during discharge mode defines the amount of power to be drawn from the storage source 1060. The duration of discharge is dependent on the energy content of the storage unit 1060. Before the storage unit is exhausted the control system 221 transfers the load to the alternative power source (if provided) or shuts down the load. In discharge mode C (block 714), the system determines whether the grid has stabilized and the fault continues to exist. If the fault no longer exists and predefined conditions are meet (i.e., the grid is stable for a predefined period of time), the system transitions back to normal operating conditions, normal operating mode A (block 710). If the fault continues, a switch-over to alternative power source mode D (block 716) is entered where the system 220 begins a transition to the alternate power generation source (gen set) mode. The detection and mode selection unit 1080 is capable of activating the alternative power source on the basis of storage-related factors (such as for example, remaining storage time), generator start up times, and/or other parameters. The control system allows for computing suitable transfer parameters from either measured or characteristic (fixed) data. The system 220 prevents the storage unit 1000, such as battery 1060, from operating in an unsafe manner (e.g., outside its operational envelope).

In discharge mode B, the control strategy has changed from a current or power control mode to a voltage control mode dictated by the converter voltage controller 232. Under island discharge conditions (i.e., load isolated from the grid) the load 222 defines the reactive and active power. Both reactive and active power are supplied by VSC 240 and storage unit, battery 1060. The converter voltage controller 232 receives a reference load active voltage $V_{LW}^*$, and at least the load active and reactive voltages $V_{LW}$, $V_{LB}$ are fed back to the converter voltage controller 232. The converter voltage controller controls the VSC and storage unit based on the load active and reactive voltages through the pulse pattern generation unit 252. One advantage of applying reactive and active power through the VSC is that the VSC significantly reduces frequency variations due to load switching.

Figure 11:
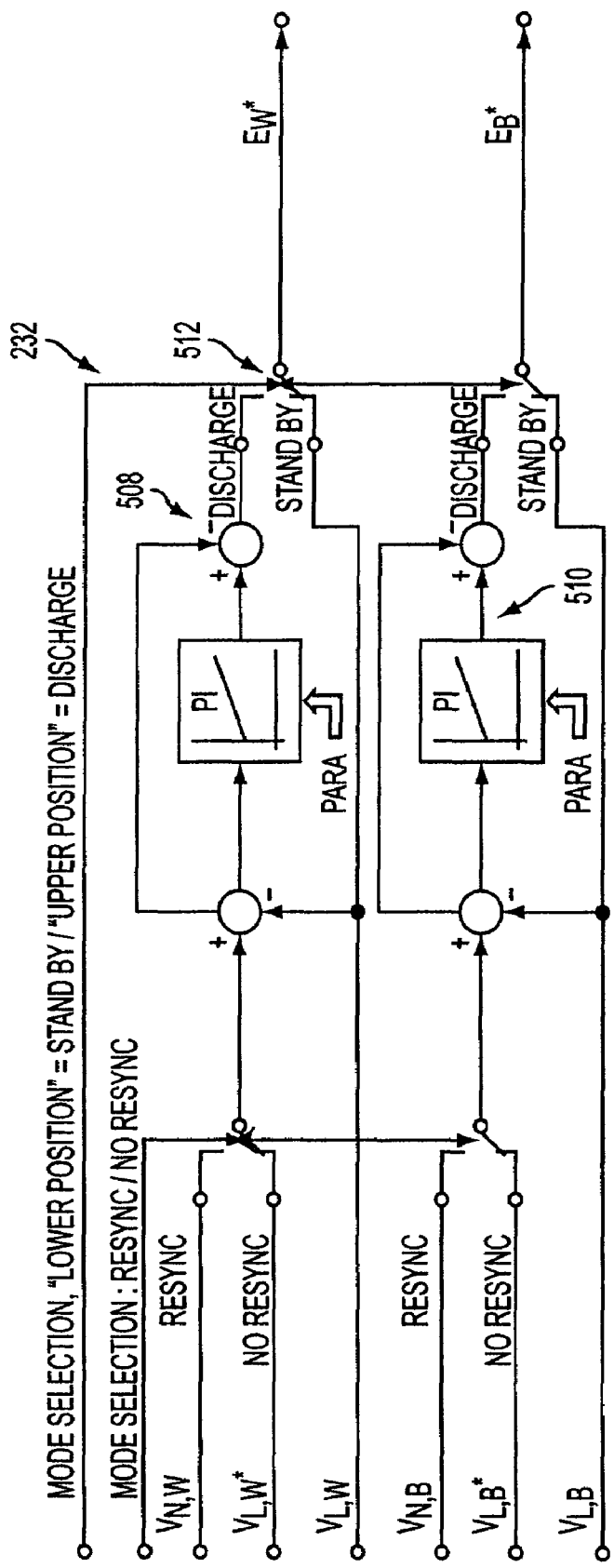
FIG. 11 depicts a simplified block diagram depicting one implementation of one embodiment of the converter voltage controller.

FIG. 11 depicts a simplified block diagram depicting one implementation of one embodiment of the converter voltage controller 232. In one embodiment, the converter voltage control 232 is a standard closed loop controller, as known in the art. In one embodiment, the converter voltage control 232 is composed of two PI-type feedback control circuits, a first control circuit 508 computing the active component $E_W^*$ and second 510 computing the reactive component $E_B^*$ of the voltage. Again, space vector theory may be used to derive the real and reactive voltage components. Through a pre-control the voltage drop of a VSC transformer is calculated. The converter voltage controller 232 is disabled 512 in standby and charge modes. In these modes the load voltage $V_L$ is simply switched directly to the output, where it is added to the output of the current controller and is used as pre-control in standby and charge mode. During discharge mode the load voltage $V_L$ is controlled to its reference value to compensate the voltage drop over the VSC transformer. In resynchronization mode the reference value of the voltage controller is the grid voltage $V_N$.

Figure 12:
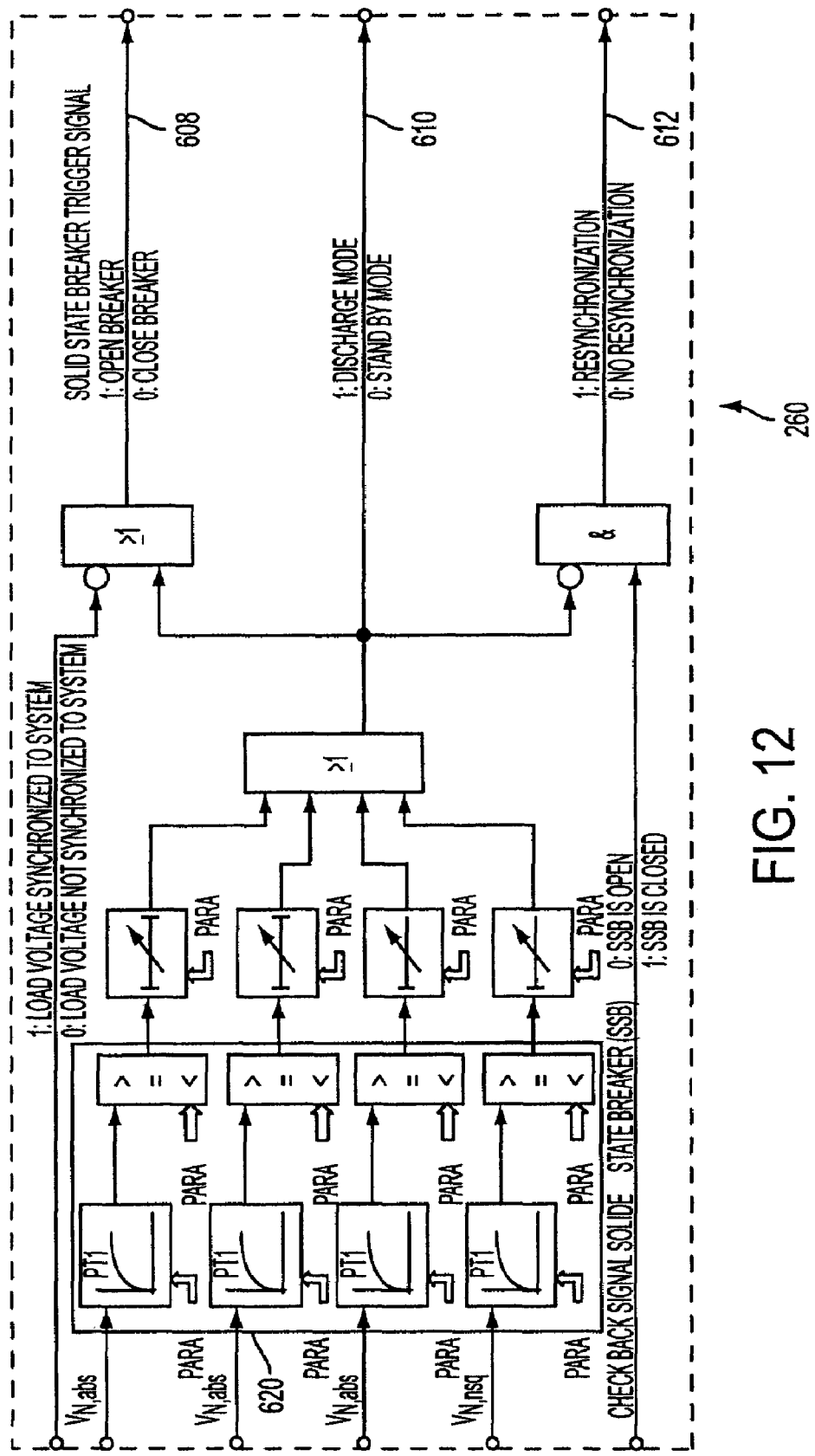
FIG. 12 depicts a block diagram of one implementation of one embodiment of the detection and mode selection unit.

FIG. 12 depicts a block diagram of one implementation of one embodiment of the detection and mode selection unit 260 which detects grid conditions and determines the mode of operation. The detection and mode selection unit detects grid faults and voltage dips (single phase as well as two or three phase dip conditions). After detection of an abnormal grid condition the detection and mode selection unit activates the SSB 262 to disconnect (solid state breaker trigger signal) 608 the faulty source from the load. The detection and mode selection unit 260 further signals the energy storage unit, in one embodiment battery 1060, to build up load voltage by utilizing the VSC capabilities (via the voltage controller 232) to transfer real power to the load.

The detection and mode selection unit 260 also reactivates 610 the standby mode if the grid returns to normal levels, and also signals resynchronization 612 if desirable from system conditions.

The detection circuit 620 utilizes the amplitude of the system voltages, voltage ($V_{N,abs}$). In one embodiment, the amplitude is obtained from two linearly independent components resulting from the application of the space vector theory. In one embodiment, the detection and mode selection unit has three levels with graded reaction times according to the Computer and Business Equipment Manufacturers' Association (CBEMA) or Information Technology Industry Council (ITI) curve. The accompanying Table 1 illustrates some of the values requested by the CBEMA (ITI) curve. For example, if the supply voltage magnitude sags to 70% of nominal for 1.2 cycles or longer, then the detection unit initiates an event whereby the SSB 262 is activated to disconnect the grid from the load and the energy storage unit, in one embodiment battery 1060, is utilized by the VSC 240 to restore voltage to normal levels. Other values, rules, or policies may be implemented in the control scheme. 1TABLE 1 Requested ride through according to CBEMA (ITI) Supply voltage magnitude rms (% of nominal) Time duration [60 Hz cycles] 0 Up to 1.2 70 Up to 30 80 Beyond 30

Charge Mode

Charge mode refers to recharge storage either in island mode or if the load is connected to the grid, or to storage conditioning. With further reference to FIGS. 9A and 9B, in step G (block 724), the control system 221 transfers the system 220 into charge mode and carries out a recharge of the energy storage system, for example battery 1060 after nominal completion of the discharge event. The storage unit supplier typically specifies charging algorithms. Charging algorithms are usually specific to the particular energy storage module 1000 and are known in the art.

Recharging may occur either during island operation, sourced by the alternative gen set, or after return to normal grid operation, or both, as depicted in block 724 of FIGS. 9A and 9B. The control system 221 hardware and software and method generally, allow flexibility to implement different charge scenarios. For example, if the alternative source 1030 is sufficiently sized in comparison to the load 222, it may be desirable to partly or fully charge the storage system 1000 during island operation (block 720 of FIGS. 9A and 9B), based on a set of pre-programmed rules or policies. In this case the control system 221 would monitor the existing load 222, the generator 1030 capacity and the storage state of charge 1000 and decide when to utilize the excess power of the alternative power source 1030. It is worth noting that the energy storage system 1000 is useful for load stabilization and may be dynamically charged or discharged during island operation.

When the system 220 is operating in the charge mode, the energy storage unit 1000 is recharged and the control system switches over to the standby mode automatically. VSC 240 draws power from the grid 224 or generator 256 to be stored in the storage unit 1000. The implementation of control system 221 differs according to the specific attributes of different storage units, examples are shown in the accompanying Table 2. Below, specific exemplary embodiments of control system 221 are discussed for three situations—when storage module 1000 comprises: (i) a chemical battery, (ii) a SMES, and (iii) a flywheel. It is to be understood by those workers having ordinary skill in the art in light of the description provided that similar embodiments may be implemented for other storage technologies, including but not limited to electrochemical capacitors and compressed air energy storage (CAES), and that the inventive concept, system, and method are applicable to a these particular storage technologies as well as to a variety of other energy storage technologies now existent or to be developed. 2TABLE 2 Control System Modules Active for Storage Applications Battery SMES Flywheel Control Mode Automatic x x x VSC Current Controller x x x VSC Voltage Controller x x x Battery Management Voltage and x Current Controller Magnet Current Controller x DC link Voltage Controller x x Generator Excitation Control x Setpoint Generation unit x x Rectifier voltage control x Pulse Pattern Generation VSC x x x Pulse Pattern generation DCC x Flywheel charge control x DC Chopper control x First, we turn to the case where storage module 1000 comprises an electro-chemical or other chemical storage, such as battery 1060. This embodiment is illustrated in FIGS. 8A and 8B with and AC-connected or DC-connected gen set, respectively representing generation module 1030. Briefly, the basic building block of a battery module is an electrochemical cell. A single module may have one or more cells in series, in parallel, or in series/parallel combination. A battery string or array may be a series connection of several battery modules to obtain the needed battery voltage suitable for the power conversion systems. Strings may be paralleled to gain the desired energy or energy capacity. The most commonly used battery type is the lead-acid (Pb-acid) type. Other technologies like Sodium Sulphur, Sodium Polysulfide, Vanadium Redox, or Zinc Bromine are emerging for energy storage applications, and may be utilized as battery 1060. The voltage of a Pb-acid cell typically decreases as the discharge progresses. Manufacturers typically specify an end of discharge (EOD) voltage or cut off voltage. Therefore for a constant power discharge the current is highest at the end of discharge.

The DC-link voltage is defined by the voltage and current (V/I) characteristic of the battery. A battery management system 243 is advantageously added to control recharge of the battery. Battery charging is assumed to take place in two or more constant current or constant voltage steps. The process is sequential and change-over to the next step occurs when a specified current or voltage is reached. Depending on the charge state of the battery the current or the voltage of the battery and accordingly the voltage of the DC-link is controlled. The output of the battery voltage controller 244 or of the battery current controller 245 is switched to provide the input $I.sub.W^*$ to the VSC current controller 230, which sets VSC active power output. For both charge and discharge the VSC active power establishes the battery current and, via voltage-current characteristic, the battery voltage. In discharge mode the battery management system 243 and the VSC current controller 230 are disabled, and I.sub.W is determined by the load.

Thus, when storage module 1000 comprises a chemical battery, such as battery 1060 in FIGS. 8A and 8B, the battery management system 243 in cooperation with the battery voltage control 244 determines that the voltage level of the storage system has fallen below a predefined threshold. The battery voltage control 244 signals the converter current controller 230 to charge the storage unit 1000, battery 1060. The current controller 230 signals the pulse pattern generator unit 252 which in turn activates the VSC 240 to draw power from the grid or generator and charge the storage unit 1000, battery 1060.

Another embodiment is shown in FIG. 13A, where a SMES is utilized for energy storage. For simplicity, generation system 1030 and associated controls are not shown in FIG. 13A. It is to be understood that a generation module, such as an AC- or DC-connected gen set may be utilized along with storage module 1000 comprising SMES. The stored energy (E) in a SMES is proportional to the SMES coil inductance (L) multiplied by the square of the coil current (I), or $E = \frac{1}{2} LI^2$ where the proportionally constant here is ½.

Briefly, SMES, as a magnetic energy storage system, can be treated as a current source which can be transferred into a voltage source by chopping its DC-current (by means of an extra device, such as a DC chopper) and charging and discharging its DC-Link capacitor considering acceptable DC-Link voltage ripple. The magnetic field created by the flow of direct current in a coil of superconducting material stores electrical energy. As energy is removed from the SMES, the coil current decreases. To maintain the coil in its superconducting state, it is immersed in liquid helium contained in a vacuum-insulated cryostat. Typically, the coolant is liquid helium at 4.2 K (4.2 Kelvin) or super-fluid helium at 1.8 K (1.8 Kelvin). Large SMES systems beyond 10 MW with storage times of several minutes are under development and may be utilized. Their design is based on low temperature superconductors (LTS), for example niobium-titanium. Such systems may advantageously be utilized in storage module 1000. SMES systems are still in a developmental stage, though systems are becoming commercially available.

Referring to FIG. 13A, charging and discharging of a SMES requires a DC Chopper 4000 (DCC) to be connected between the superconducting magnet 4010 and the DC link circuit of the VSC. As shown in FIG. 13A the energy storage control module 2000 comprises the SMES charge control 4020, the DC link voltage control 4030, and the pulse pattern generation unit 4040.

In charge mode (block 724 in FIG. 9A) and standby mode (block 710 in FIG. 9A), the magnet current I.sub.Mag is controlled by the energy storage control module 2000. The SMES charge controller 4020, the Q-controller 242 and the VSC current controller 230 are disabled in discharge mode (block 714). The DC link voltage V.sub.DC is controlled by the DC link voltage controller 4030 in all control modes. In this mode, that is during operation of the VSC 240 to mitigate a sag or outage, energy is drawn from the DC link capacitor causing the DC link voltage to drop. However the DC link voltage controller 4030 attempts to maintain the DC link voltage by adjusting the input $I.sub.DC^*$ of the pulse pattern generation unit 4040 of the DCC, such that the DCC discharges the magnet to restore the DC link voltage.

Charging the magnet is the reverse process of the above mentioned. The output of the DC link voltage controller 4030 is connected to input $I.sub.DC^*$ of the pulse pattern generation unit 4040 of the DCC. The modulation factor defines the power flow from the magnet to the DC link or vice versa. In charge mode the reference value $I.sub.W^*$ (which is proportional to the required magnet charging power) depends on the SMES characteristic implemented in the SMES charge controller. In standby mode, the reference value $I.sub.W^*$ is theoretically zero, but in practical terms due to standby losses there will typically be some continuous low level charging.

In yet another embodiment, as shown in FIG. 13B, a flywheel is utilized for energy storage. For simplicity, as with FIG. 13A, generation system 1030 and associated controls are not shown in FIG. 13B. It is to be understood that a generation module, such as an AC- or DC-connected gen set may be utilized along with storage module 1000 comprising a flywheel. Briefly, a rotating flywheel as a kinetic energy storage system can act as a prime mover for a generator. Therefore, a flywheel utilized as an energy storage device may also serve as part of generation module 1030. The stored energy (E) in flywheels is proportional to the flywheels moment of inertia (J) multiplied by the square of its angular speed (W), or $E = \frac{1}{2} JW^2$ where the proportionally constant here is ½. Because of the square dependency (like SMES) and the advent of new composite materials with high tensile strength, high velocities are attractive to store large amounts of energy. Recent developments report attainable angular speeds from several tens of thousands up to 100,000 revolutions per minute. Similar to SMES, as energy is removed, the speed decreases. Flywheel energy storage systems are still in a developmental stage, though systems are becoming commercially available. Flywheels in the several tens to several hundreds of Megajoules range (1 MJ=1 MW-sec) are available in both the slow running steel type wheels, as well as in the newer glass fiber composite wheels operating at high speeds.

The conversion of kinetic energy to electrical energy requires an electrical generator (storage discharge). Typically an AC generator 5010 is applied and produces an output frequency which varies with the (decreasing) speed of the flywheel. For conversion of electrical energy to kinetic energy an electrical motor 5020 is required to facilitate storage charge capabilities.

For charging and discharging of a flywheel, a motor/generator unit or a generator with a separate pony motor is used, as known in the art. By utilization of an additional rectifier 5030 between the VSC 240 DC link circuit, and the generator unit, the speed (frequency) dependency of the flywheel output can be de-coupled in what may be referred to as a classical back-to-back arrangement.

In contrast to SMES and battery, system discharging and charging controls may typically be implemented by separate systems. As shown in FIG. 13B, the flywheel energy storage control module 2000 comprises at least a DC link voltage control, a current control and a rectifier pulse pattern generation unit 5050. The control system 221 and method provides for input of flywheel status signals such as operating speed. For the flywheel, a generator excitation control 5040 and a motor control subsystem 5060 (comprised of a flywheel charge control 5061 and motor control unit 5062) are also usually deemed necessary and may or may not be supplied with the flywheel. Thus, optionally, storage control module 2000 may also comprise one or more units of the flywheel motor/generator control package 5070, FIG. 13B, depending on the extent of the controls implemented by the flywheel manufacturer. In discharge mode, the flywheel generator is connected to the DC link via a controlled rectifier 5030. The controlled rectifier bridge is gated by the rectifier control 5050 trigger set in such a manner that the rectified generator current flows into the DC link, maintaining the DC-link capacitor voltage. For charging the flywheel 5000, a pony motor 5020 is used to restore the flywheel speed to its nominal value (stored energy is proportional to angular velocity squared). This is achieved by means of the flywheel charge control 5061 through the motor control unit 5062. The output of the charge controller 5061 represents the pony motor torque reference value. In standby mode the flywheel speed is also kept constant or at some designated speed by the flywheel charge control 5061, in order to overcome windage, friction, and other standby losses in the rotating machine.

As described above, the SMES-specific controllers and the flywheel-specific controllers are optionally plug-and-play modules that may be interchanged or adapted as needed. Thus, if the battery 1060 in the system is replaced by another energy storage device, such as an SMES device, the battery energy storage control module may be replaced (either with a new hardware and software control module or by reprogramming the control module) with an alternative energy storage control module that includes the SMES-specific controllers.

Gen Set Start Up

Returning to a general discussion and specifically referring to the exemplary embodiment of power source system 220 depicted in FIGS. 8A and 8B as well as the embodiment of the various modes illustrated in FIGS. 9A and 9B, if a grid fault is detected and continues, step D (block 716) is entered where system 220 begins a transition to the alternate power generation source mode.

The control system 221 and method provides for input of generator status signals such as achievement of stable nominal operating speed. After this information is received ramp up of the gen set (to take over the load) may start. Due to increase in DC link voltage, the energy drawn from the battery 1060 ramps down as the gen set 1031 or 1032 ramps up. During this transfer period the control system 221 provides load sharing between multiple energy sources for the purpose of obtaining a smooth transfer (for example, by minimizing both duration and magnitude of voltage and frequency oscillations).

In step E (block 720), the system 220 transitions to the gen set mode and the control system 221 allows for continuous operation of the alternative power source 1030 until the grid 224 returns or the alternate power source can no longer supply power (for example, if generator fuel is exhausted). During alternative power source operation, the system 220 provides for load sharing between multiple energy sources to at least maintain load frequency and voltage within an acceptable band.

In one embodiment, the system 220 provides suitable alarms to indicate that a safe shut down of the protected load (or process) is necessary due to end of storage reached, fuel exhausted, or other situation endangering sensitive load 222 or in response to other concerns or criteria.

It should be noted that, with implementations of power system 220 with a DC-connected gen set 1032, for load side short circuits special cases exist which may require transfer from a DC connection of the Gen set to an AC connection, represented as block 3000 of FIG. 9B. This effect, known as 'insufficient short circuit power (on load side)', can be mitigated by temporarily rearranging the Gen set connection (from DC to AC) via an additional SSB 1035 (FIG. 7B) to allow for fault clearing contribution in load side breakers and/or fuses. Control system 2000, through the sag and outage detection module 1080, advantageously monitors load side voltage and current parameters so as to determine the event of a load side fault requiring generator reconfiguration, and provides the required signals to activate switch over from DC to AC connection, and return to DC connection when conditions warrant.

When the grid (voltage and frequency) returns to a normal range or level step F (block 722) is entered and the system 220 transfers the load from the alternative source to the grid. In one embodiment, the control system advantageously but optionally ensures that the generator 1030 operates for a minimum period of time after a start to allow the mechanical system to reach stable operating temperature. During this time frame, the energy storage unit 1000 may be recharged.

Referring back to FIGS. 8A and 8B, in one embodiment, following the detection of a power fault on the grid 224, the detection and mode selection unit 1080 further activates the gen set 1031 or 1032, such that the gen set 1031 or 1032 provides longer term power to load 222, as discussed above. Generation module 1030, more generically, represents substantially any power generation source such as a motor or engine in combination with a power generation process, and substantially any other power generation source or combination known in the art. In one embodiment, the gen set 1031 or 1032 is activated if the energy content of the storage unit 1000 is below a predefined threshold. In one embodiment, the gen set 1031 or 1032 is not activated until the fault is detected on the grid for a predefined period of time. The detection and mode selection unit 1080 signals a power generation control unit 2010 which initiates the gen set. The gen set speed n ramps up, while the VSC 240 and storage unit 1000 continue to supply power to the load. The gen set speed n is continued to be controlled by the power generation control unit 2010. In one embodiment, the gen set includes a fuel injection system 554 which determines the torque of the gen set. The amplitude of the generator output voltage $V_{Gen,abs}$ is controlled by a generator excitation control unit 282.

Referring back to FIG. 8A, in one embodiment, the power source system 220 includes a generator, such as a diesel gen set, connected to the load. The structure of the block diagram shown in FIG. 8A includes the structure of the generator control topology with energy storage.

After the detection and mode selection unit 1080 has caused the SSB 262 to open in the event of a grid fault, the diesel start/stop unit 550 of the power generation control unit 2010 starts the generator and the generator speed n ramps up, while the storage unit 1000, comprising battery 1060, supplies the load. The VSC current controller 230 is disabled. The generator speed n is controlled by the generator control system 552 which is part of the power generation control unit 2010. The fuel injection system 554 determines the torque of the generator. The amplitude of the generator output voltage $V_{Gen,abs}$ is controlled by the generator excitation control 282.

Once the gen set 1031 is activated, and the gen set output has reached a sufficient level, the generator output voltage $V_{Gen}$ is synchronized with the load voltage $V_L$ supplied by the VSC 240 and storage unit 1000. In synchronizing, a synchronizing unit 284 receives the load voltage $V_L$ and the generator voltage $V_{Gen}$ such that the synchronizing unit 284 signals the detection and mode selection unit 1080 to connect the gen set 1031 to the load 222 to supply power to the load. When the generator output voltage $V_{Gen}$ has been synchronized to the load voltage $V_L$ a generator switch 286 is activated by the power generation control unit 2010 to close, connecting gen set with the load. In one embodiment, to gain an optimized (smooth and/or bumpless) takeover from the discharge mode without the gen set, to the gen set forming the primary power source, the control system 221 provides a load sharing which ramps the active power output of the VSC 240 and storage unit 1060 down as the output from gen set 1031 ramps up. As the power supplied by the gen set ramps up, the converter current controller 230 signals the pulse pattern generation unit 252 to ramp down the power supplied by VSC 240 and supply system 1000, in FIG. 8A comprising battery 1060.

When the generator output voltage is synchronized through the synchronizing unit 284 with the load voltage $V_L$, the generator switch 286 is closed, and the operation mode is switched to standby mode. The VSC current controller 230 and Q-control 242 are enabled. The VSC voltage controller 232 is disabled. The VSC current controller 230 ramps the VSC active power down as the gen set 1031 ramps up and takes over the load.

STATCOM operation of the VSC improves the stability of the load voltage. While the Gen Set 1031 supplies the load, at least two different methods of VSC control are possible in dynamic cases. In one embodiment, the VSC 240 takes over no active power at any time. In an alternative embodiment, the VSC takes over a part of the active power. The latter case is possible if there is sufficient storage capacity in the storage unit 1000, comprising for example battery 1060.

Battery charging is possible during gen set operation. Moreover this is beneficial when the generator is implemented through a diesel engine because diesel engines should be operated (at least from the standpoint of engine longevity) until reaching nominal operating temperatures before being shut down.

The detection and mode selection unit 1080 continues to monitor the grid during each mode of operation, including gen set, UPS and STATCOM modes. After the grid voltage $V_N$ has returned to normal operating ranges, the gen set 1031 is synchronized to the grid voltage $V_N$. If the load voltage $V_L$ is synchronized to the grid voltage $V_N$ the detection and mode selection unit 1080 closes the SSB 262. The grid 224 takes over the load, the generator start/stop unit 550 ramps down the fuel injection of the generator, and the generator switch 286 is opened. In one embodiment, STATCOM mode is entered to continue to provide static compensation.

Parallel Operation Gen Set and UPS

When the generator switch 286 has been closed the converter current controller 230 and the Q-controller 242 are also activated, and the converter voltage controller 232 is deactivated. Thus, the control shifts from a voltage control to a current or power control. The load voltage $V_L$ is determined by the gen set 1031 with active assistance from the VSC 240 and storage unit 1000, comprising for example battery 1060. The active and reactive power $P_W$, $Q_B$ of the VSC 240 are controlled through the converter current controller 230. The battery management system 243, battery voltage control 244 and battery current control 245 aid in controlling the load sharing between the UPS and the gen set under dynamic (transient) conditions, thereby enhancing stability of the load.

The converter current controller 230 slowly ramps the converter active power $P_W$ supplied by the storage system 1000 down as the gen set 1031 takes over the load 222. In one embodiment, under steady state conditions, the UPS (typically including, but not limited to or requiring, VSC 240, battery 1060, battery management system 243, and controllers 230, 242, 244, 245, 252 and 260) does not provide active power. The VSC 240 provides reactive power $Q_B$ to the load 222 as needed thus continuing to providing STATCOM functionality. With the STATCOM functionality and control, operational stability of the load voltage $V_L$ is enhanced.

Under steady state conditions the gen set provides the active power for the load 222. In one embodiment, under dynamic conditions, due to the relatively slow speed control of an electromechanical system in combination with the power generation process, the speed of the system may vary in a wide range. Therefore; dynamic frequency variations may occur. The UPS, including VSC 240 and storage unit 1000 with its short response time, minimizes or attempts to minimize frequency fluctuations by injecting or absorbing active power. In one embodiment, due to the limited storage of the storage unit 1000 the UPS controls the average amount of active power to substantially zero.

Transfer to the Grid

While operating to supply the load through the UPS or the gen set, the detection and mode selection unit 1080 continues to monitor the grid 224 to determine if the grid voltage $V_N$ has returned to substantially normal levels. In one embodiment, transition to the grid occurs after normal levels are detected. Once the power fault on the grid disappears and the grid voltage $V_N$ returns to normal levels the gen set voltage $V_{Gen}$ and the load voltage $V_L$, are synchronized to the grid voltage $V_N$. The synchronization unit 284 receives the gen set output $V_{Gen}$, load voltage $V_L$, and the grid voltage $V_N$. The synchronization unit signals the detection and mode selection unit 1080 to provide control signals to the current and/or voltage controllers 230, 232 to adjust the gen set and/or VSC such that the load voltage $V_L$ synchronizes with the grid voltage $V_N$. Once the load voltage $V_L$ is synchronized to the grid voltage $V_{.sub.N}$ the detection and mode selection unit closes the grid switch 262 again coupling the grid with the load. The detection and mode selection unit 1080 in combination with the reference value generator 248 ramps down the VSC 240 and/or fuel injection 280 and thus the gen set 1031 through the generator excitation controller 282. The load sharing transitions the power supply from the gen set 1031 and/or VSC 240 to the grid 224, where the grid takes over the load 222 and generator switch 286 is opened. The system 220 then returns to standby or charge mode as described above.

FIGS. 14A-E depict graphical representations of the operation of an embodiment of the system 220 with the VSC 240 and storage unit 1000 being activated to compensate for a sag on the grid 224 at time t=50 ms. FIG. 14A shows a graphical representation of the three phase grid voltage $V_{.sub.an}$-$V_{.sub.cn}$, with the voltage sag at t=50 ms. FIG. 14B shows the graphical representation of the three phase load voltage $V_{.sub.al}$-$V_{.sub.cl}$ during the voltage sag. Note that the sag in the load voltage is compensated for within approximately 6 ms through the VSC 240 and storage unit 1000. FIG. 14C depicts a graphical representation of the amplitude of the grid voltage $V_{.sub.absn}$ and the load voltage $V_{.sub.absl}$ showing the system 220 rapidly responding the sag. FIG. 14D depicts a graphical representation of the three phase load currents $I_{.sub.la}$-$I_{.sub.lc}$, and FIG. 14E depicts a graphical representation of the three phase compensation currents supplied by VSC 240 and storage supply 1000 to the load 222.

FIGS. 15A-E depict graphical representations of the system 240 shifting from the UPS mode to the gen set mode where the gen set takes over the load 222 during the sag conditions at t=100 ms. FIG. 15A graphically shows the load voltage $V_{.sub.al}$-$V_{.sub.cl}$ as the voltage supplied to load transitions from the VSC 240 to the gen set. FIG. 15B graphically depicts the amplitude of the grid voltage $V_{.sub.absn}$ and the load voltage $V_{.sub.absl}$ as the gen set takes over and supplies power to the load 222. FIG. 15C graphically shows the three phase load current $I_{.sub.la}$-$I_{.sub.lc}$ as the gen set takes over. FIG. 15D graphically shows the three phase VSC current $I_{.sub.a}$-$I_{.sub.c}$ as the load sharing ramps down the VSC 240, and FIG. 15E graphically shows the three phase generator current $I_{.sub.aG}$-$I_{.sub.cG}$ as the load sharing ramps up the gen set current supplied to the load to maintain the load at a stable state. As seen in FIG. 15A, the load voltage decreases to approximately 85% and the generator excitation controller 282 takes approximately 150 ms to lift the load voltage. In one embodiment, the STATCOM function of the VSC 240 is activated to mitigate this voltage decrease. (For demonstration purposes the STATCOM function was not activated during the generation of FIGS. 15A-E.)

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. Having described the best mode, it is intended that the scope of the invention be defined by the claims appended hereto and their equivalents.

What is claimed is:

1. A method for supplying electrical power to a load which is normally connected to an electrical grid, the method comprising: (1) using a control system which is operatively coupled to: the grid, a power storage unit, a static compensation device, and a generator set to determine the characteristics of electrical power supplied by the grid; and (2) based on the determined characteristics, supplying power of predetermined proper characteristics to the load through at least one of a plurality of modes of operation selected by the control system, including a standby mode in which static-compensated power from the grid is supplied to the load, an alternative power source mode in which the generator set, which is independent of the electrical grid, is coupled to the load, and a discharge mode in which the power storage unit is coupled to the load; wherein the power supplied to the load is continuously under either current control or voltage control, the type of control being determined by the control system based upon which mode is active.

2. The method as claimed in claim 1, further comprising supplying power simultaneously through at least two of the plurality of modes of operation.

3. The method as claimed in claim 1, wherein: the standby mode includes (1) monitoring the grid; and (2) disconnecting the load from the grid if a fault is detected on the grid; and (3) initiating the discharge mode.

4. The method as claimed in claim 3, further including: providing static compensation during the discharge mode.

5. The method as claimed in claim 3, further including: initiating the alternative power source mode and ramping up power supplied through the generator set; and ramping down the power supplied through the discharge mode as the power supplied through the alternative power source mode is ramping up.

6. The method as claimed in claim 5, further including: monitoring the grid while operating in the alternative power source mode; synchronizing the power supplied through the generator set with a grid AC voltage if the fault on the grid is no longer detected; connecting the grid to the load; and halting the alternative power source mode such that the power is no longer supplied to the load through the generator set.

7. The method as claimed in claim 3, further including: monitoring the grid while operating in the discharge mode; synchronizing the power supplied through the power storage unit with a grid AC voltage if the fault on the grid is no longer detected; connecting the grid to the load; and halting the discharge mode such that the power is no longer supplied to the load through the power storage unit.

8. The method as claimed in claim 1, wherein: in the alternative power source mode, the generator set is normally connected to the load via a DC connection and a DC-to-AC converter; and the method includes: reconfiguring the connection of the generator to the load from a DC connection to a direct AC connection if a fault is detected on the load.

9. The method as claimed in claim 1, further comprising providing static compensation while operating in the standby mode, the discharge mode, and the generator mode.

10. The method as claimed in claim 1, further including charging the power storage unit while operating in the standby mode and the alternative power source mode.

* * * * *